United States Patent
Trinchieri et al.

(10) Patent No.: US 12,358,355 B2
(45) Date of Patent: Jul. 15, 2025

(54) SYSTEMS AND METHODS FOR DRIVELINE CONTROL

(71) Applicant: DANA ITALIA S.R.L., Arco (IT)

(72) Inventors: Piergiorgio Trinchieri, Reggio Emilia (IT); Marco Grassi, Arco (IT); Lorenzo Serrao, Torbole sul Garda (IT)

(73) Assignee: DANA ITALIA S.R.L., Arco (IT)

(*) Notice: Subject to any disclaimer, the term of this patent is extended or adjusted under 35 U.S.C. 154(b) by 496 days.

(21) Appl. No.: 17/664,380

(22) Filed: May 20, 2022

(65) Prior Publication Data

US 2023/0373282 A1   Nov. 23, 2023

(51) Int. Cl.
*B60K 17/356* (2006.01)
*B60K 1/02* (2006.01)
*B60K 1/00* (2006.01)

(52) U.S. Cl.
CPC ............. *B60K 1/02* (2013.01); *B60K 17/356* (2013.01); *B60K 2001/001* (2013.01)

(58) Field of Classification Search
CPC .. B60K 1/02; B60K 2001/001; B60K 17/356; B60K 17/046; B60K 2023/043; B60K 2023/046; B60K 2023/0816; B60K 2023/0841; B60W 10/02; B60W 10/08; B60W 2720/403; B60W 2720/406; B60Y 2300/19; F16H 48/19; F16H 2200/2005; F16H 2200/2007; F16H 2200/2035; F16H 2200/2038
See application file for complete search history.

(56) References Cited

U.S. PATENT DOCUMENTS

| | | | | |
|---|---|---|---|---|
| 7,395,837 | B2 * | 7/2008 | Foster | F16H 3/728 475/5 |
| 8,840,498 | B2 * | 9/2014 | Park | B60K 6/365 475/5 |
| 9,399,394 | B2 * | 7/2016 | Kaltenbach | B60L 50/61 |
| 9,580,065 | B2 * | 2/2017 | Bangura | B60K 1/02 |
| 10,150,464 | B2 | 12/2018 | Bangura et al. | |
| 11,529,869 | B2 * | 12/2022 | David | B60K 17/36 |
| 2007/0107960 | A1 * | 5/2007 | Takami | F16H 3/728 180/65.6 |

(Continued)

FOREIGN PATENT DOCUMENTS

GB   2425995 A   11/2006

OTHER PUBLICATIONS

Rossia, G., "Deliverable 2.3 Development and integration of the e-Axle subsystem," sys2WHEEL Website, Available Online at https://sys2wheel.eu/wp-content/uploads/2021/02/public_fpt_eaxlesubsystem.pdf, Available as Early as Jun. 30, 2020, 14 pages.

*Primary Examiner* — Farhana Pervin
(74) *Attorney, Agent, or Firm* — McCoy Russell LLP

(57) ABSTRACT

Systems and methods are provided for dual electric motor driveline control. In one example, an assembly comprises: a first electric motor directly coupled to a first output shaft, a second electric motor coaxially aligned with the first electric motor, a planetary gear set having a carrier connected to the first output shaft and the first electric motor, a ring gear connected to ground, and a sun gear connected to a second shaft, a first clutch for selectively coupling the second electric motor to the first electric motor via the carrier, and a second clutch for selectively coupling the second electric motor to the second shaft.

6 Claims, 9 Drawing Sheets

(56) References Cited

U.S. PATENT DOCUMENTS

| | | | |
|---|---|---|---|
| 2008/0125264 A1* | 5/2008 | Conlon | F16H 3/728 |
| | | | 475/5 |
| 2010/0025131 A1* | 2/2010 | Gloceri | B60K 6/52 |
| | | | 180/65.265 |
| 2010/0051360 A1* | 3/2010 | Oba | B60L 50/16 |
| | | | 180/65.21 |
| 2012/0035014 A1* | 2/2012 | Moeller | B60K 6/445 |
| | | | 475/5 |
| 2015/0105200 A1* | 4/2015 | Duhaime | F16H 3/725 |
| | | | 475/5 |
| 2017/0138448 A1* | 5/2017 | Keller | F16H 57/033 |
| 2017/0144649 A1* | 5/2017 | Bangura | B60K 6/365 |
| 2018/0145557 A1 | 5/2018 | Hornischer | |
| 2018/0290534 A1* | 10/2018 | Pan | B60K 6/365 |
| 2019/0291566 A1 | 9/2019 | Kang et al. | |
| 2021/0114448 A1 | 4/2021 | Meyer et al. | |
| 2021/0199179 A1* | 7/2021 | Xie | B60K 6/387 |
| 2021/0291643 A1* | 9/2021 | Marechal | B60K 17/16 |
| 2021/0328526 A1 | 10/2021 | Billings | |
| 2021/0372505 A1* | 12/2021 | McGrew, Jr. | B60K 17/02 |
| 2023/0158881 A1* | 5/2023 | Bayoux | B60K 6/24 |
| | | | 180/65.23 |

\* cited by examiner

SYSTEMS AND METHODS FOR DRIVELINE CONTROL

TECHNICAL FIELD

The present description relates generally to methods and systems for a dual motor electric driveline.

BACKGROUND AND SUMMARY

When sizing a motor for traction applications, especially for off-highway machines, two factors may be considered: the overall performance requirements and the torque repartition between tractive wheels. Performance requirements may include a peak traction force at low speed and a maximum translation speed. As one example, motor peak torque may be influenced by peak traction force and motor maximum speed may be influenced by maximum translation speed. As one example, a powertrain including a two-speed transmission may allow use a significantly smaller motor. For example, peak traction force may be achieved in first gear and maximum speed in second gear, increasing the performance range of the motor without increasing the size. However, gear-shifting operations may present drivability challenges for motors using a two-speed transmission including possible torque interruption and roughness.

As an example, torque repartition between tractive wheels may be controlled by a differential system or by having multiple motors, such as one per wheel, and electronically controlling the power distribution between the motors. In normal conditions, torque distribution between the front and rear driving axles, or between the left and right wheel on the same axle may be even. However, in some cases it may be desirable to direct all torque towards a single axle, or even a single wheel, such as in slippery soil conditions with reduced traction on some wheels. It may be desirable to direct all torque to a single axle or wheel because of vehicle load distribution during work operation. As another example, directing torque to a single axle may increase efficiency and drivability of off-highway machines when traveling on-road, by switching from four-wheel drive (4WD) to two-wheel drive (2WD). Currently, such example conditions may be managed in various ways. In one example, a driveline with lockable differentials may be used to manage limited traction scenarios. In drive systems with multiple motors (e.g., one per wheel) each motor may need to be sized for loss of traction operations. As a result, the motors may be relatively oversized and less efficient in the power range corresponding to an average power demand.

The inventors have recognized the above aspects and developed a solution to at least partially address the above issues by using a first and second motor, controlled together with the addition of gear reductions and clutches, to implement a multi-speed transmission with reduced torque interruption, and/or to provide effective torque repartition on a single axle or a single wheel without significant motor oversizing.

In one example, the issues described above may be addressed by an assembly, comprising: a first electric motor directly coupled to a first output shaft, a second electric motor coaxially aligned with the first electric motor, a planetary gear set connected to the first output shaft and the first electric motor, and to a second shaft, a first clutch for selectively coupling the second electric motor to the first electric motor, and a second clutch for selectively coupling the second electric motor to the second shaft. In this way, a dual motor driveline achieves drivability during gear shifting including possible torque interruptions in a multi-speed transmission, or the torque distribution between multiple users (e.g. two axles in a machine, or two wheels on the same axles).

As one example, the assembly may include a first and second electric motor installed in a common housing with shared cooling. In this way, the assembly may be integrated into a single housing for improved mounting and reduced packaging space.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 1:
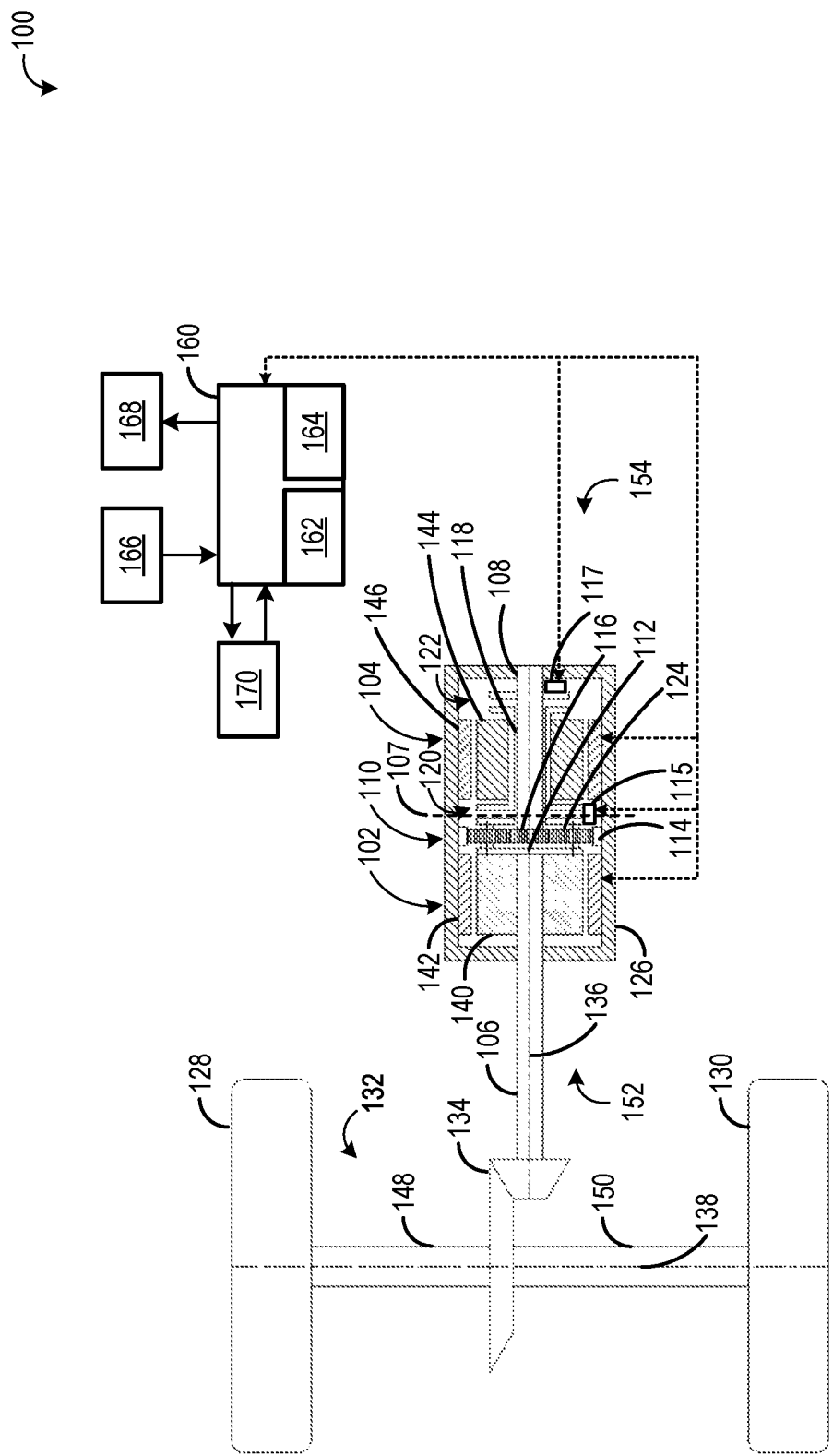
FIG. 1 shows a schematic diagram of an example drive system for a vehicle.
Figure 2:
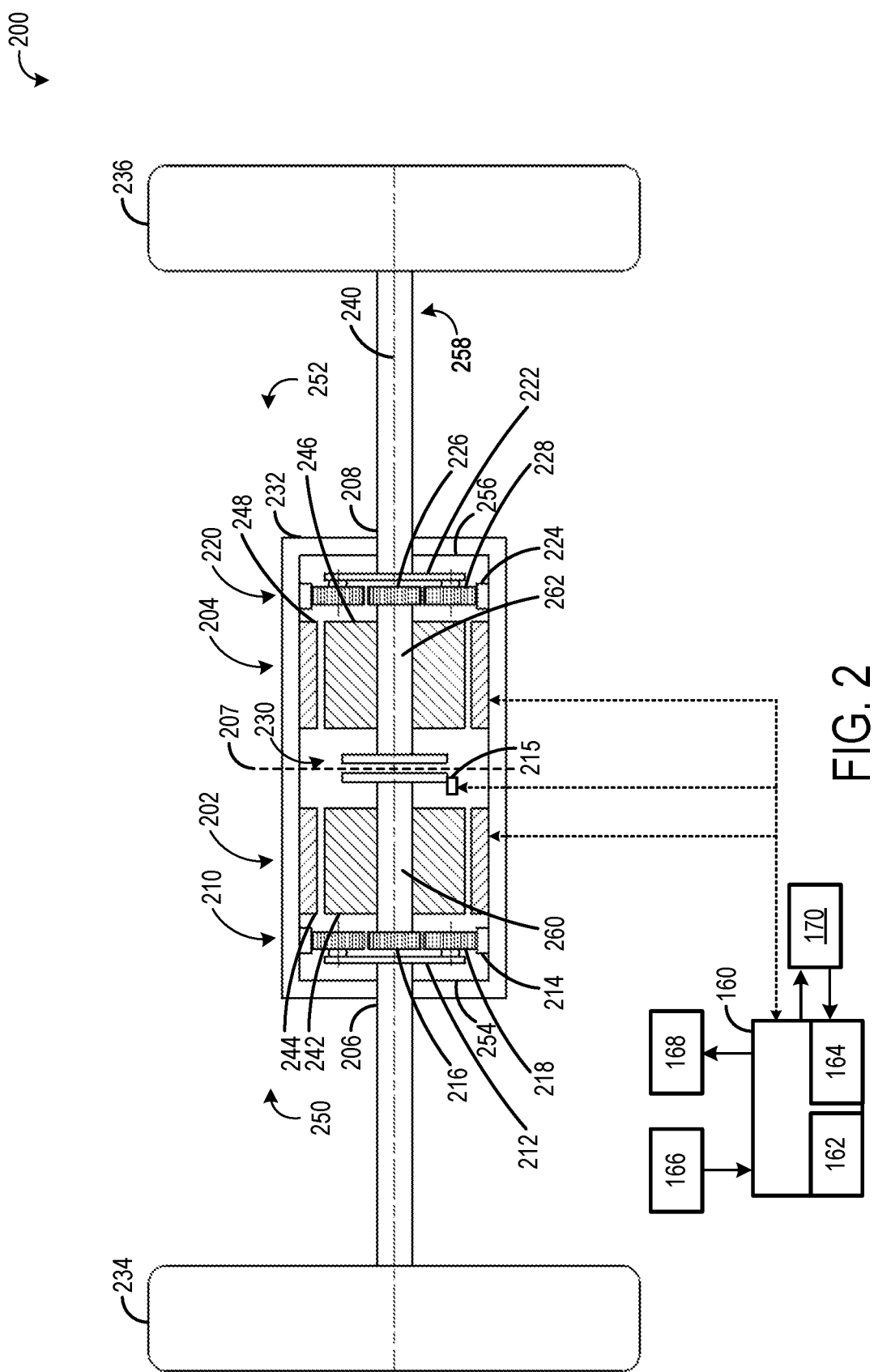
FIG. 2 shows a schematic diagram of an example drive system for a vehicle.
Figure 3A:
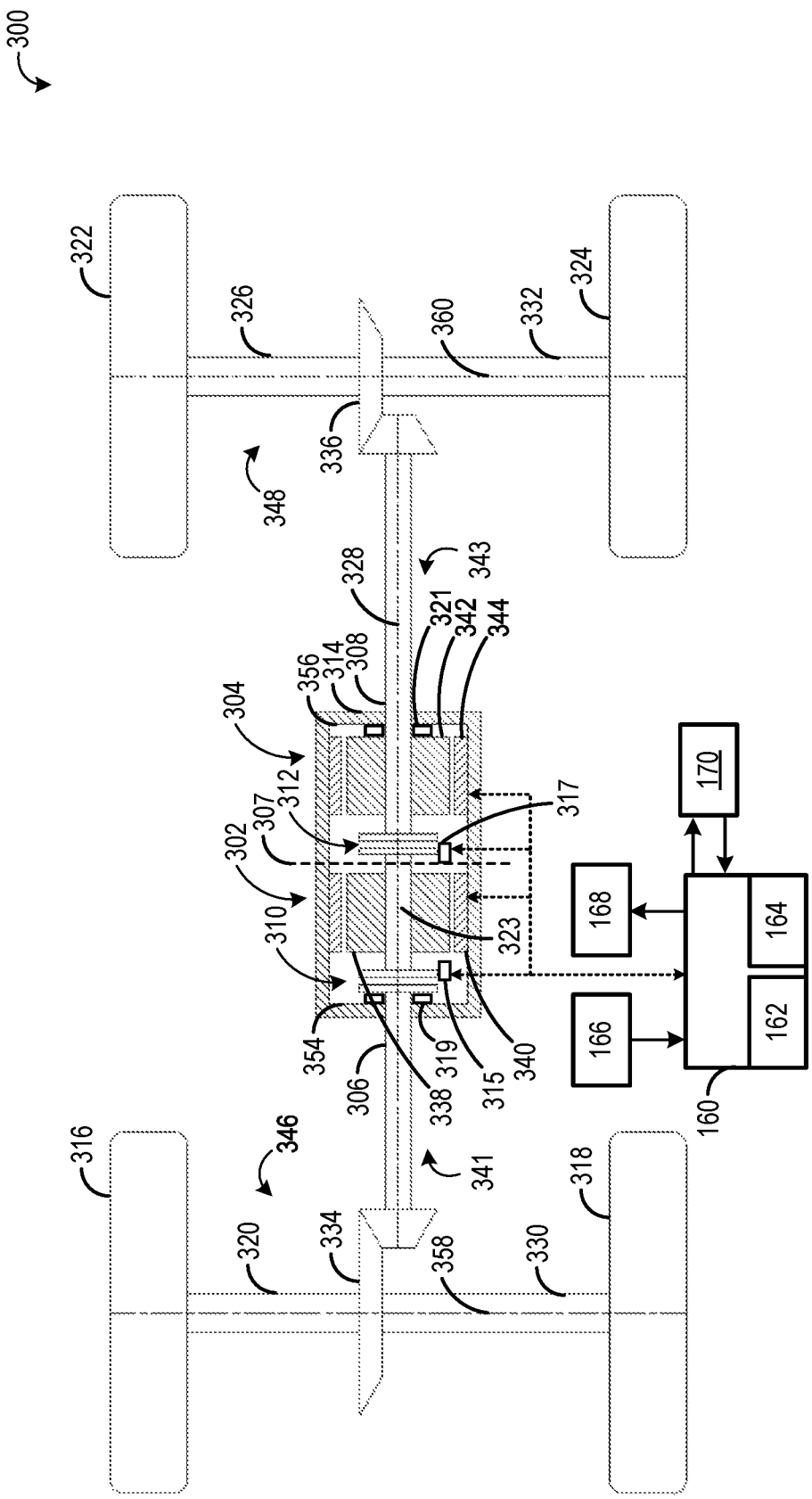
FIG. 3A shows a schematic diagram of an example drive system for a vehicle.
Figure 3B:
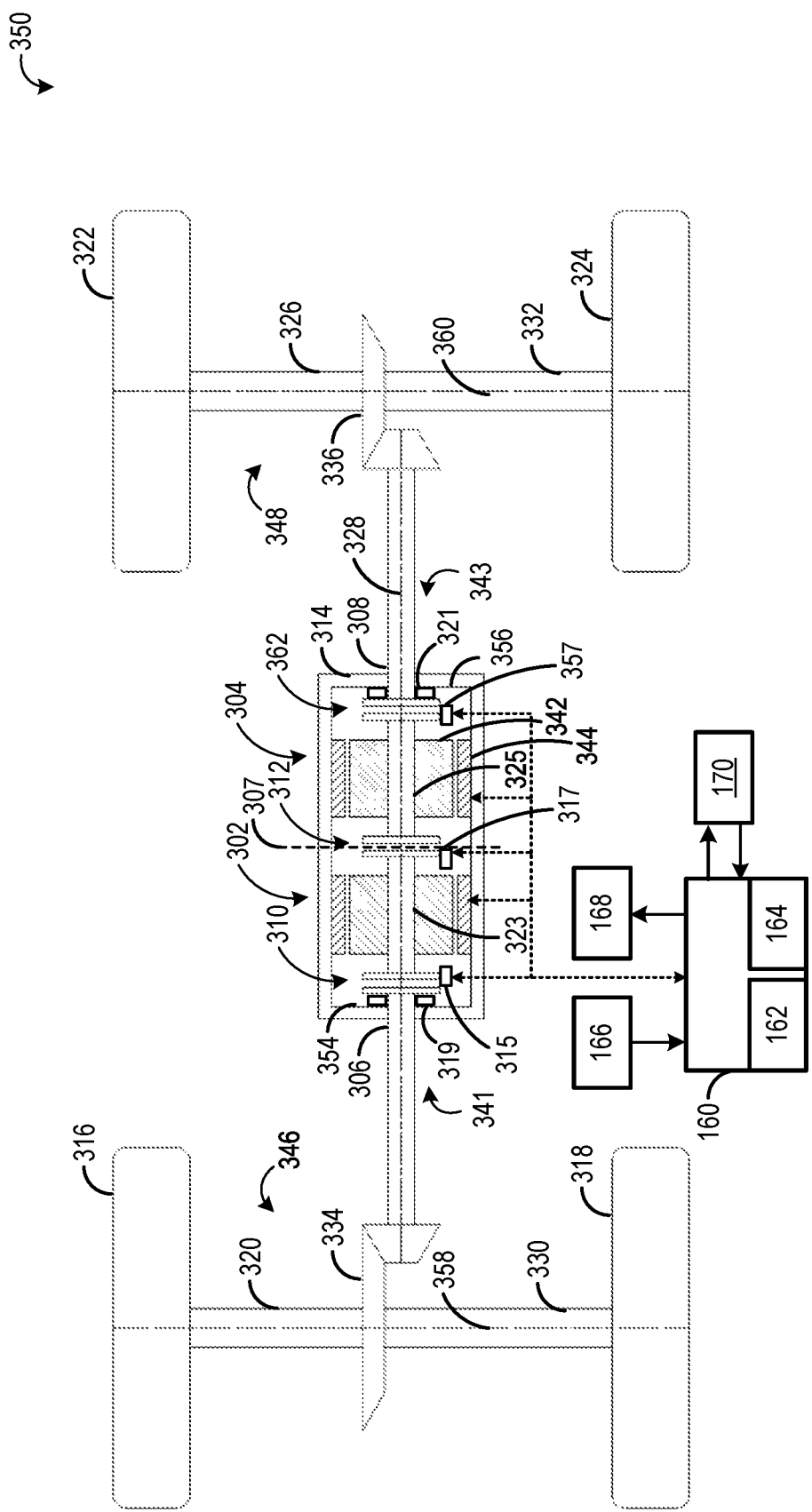
FIG. 3B shows a schematic diagram of an example drive system for a vehicle.
Figure 4:
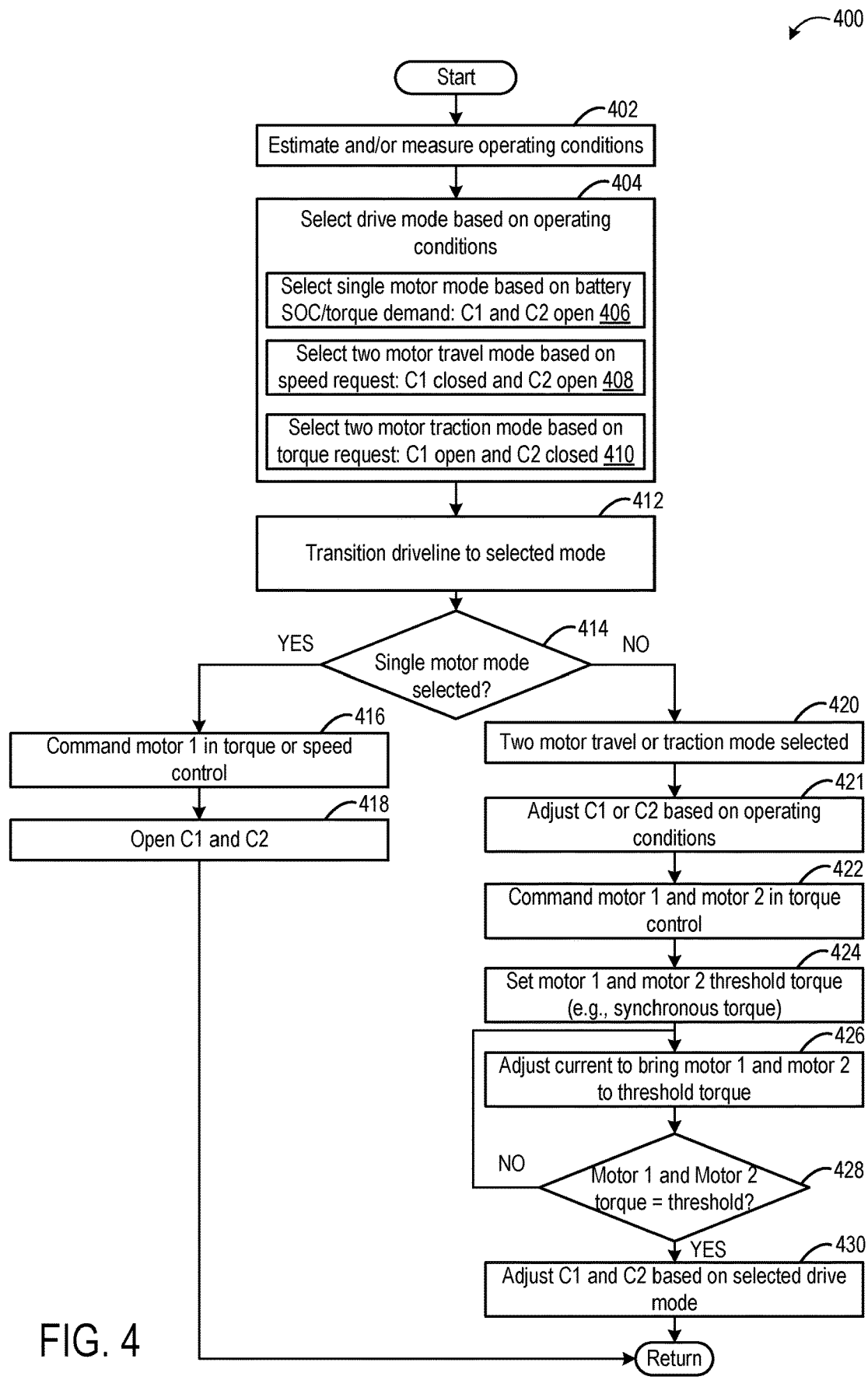
FIG. 4 shows a method for controlling a drive system for a vehicle such as the example drive system of FIG. 1.
Figure 5:
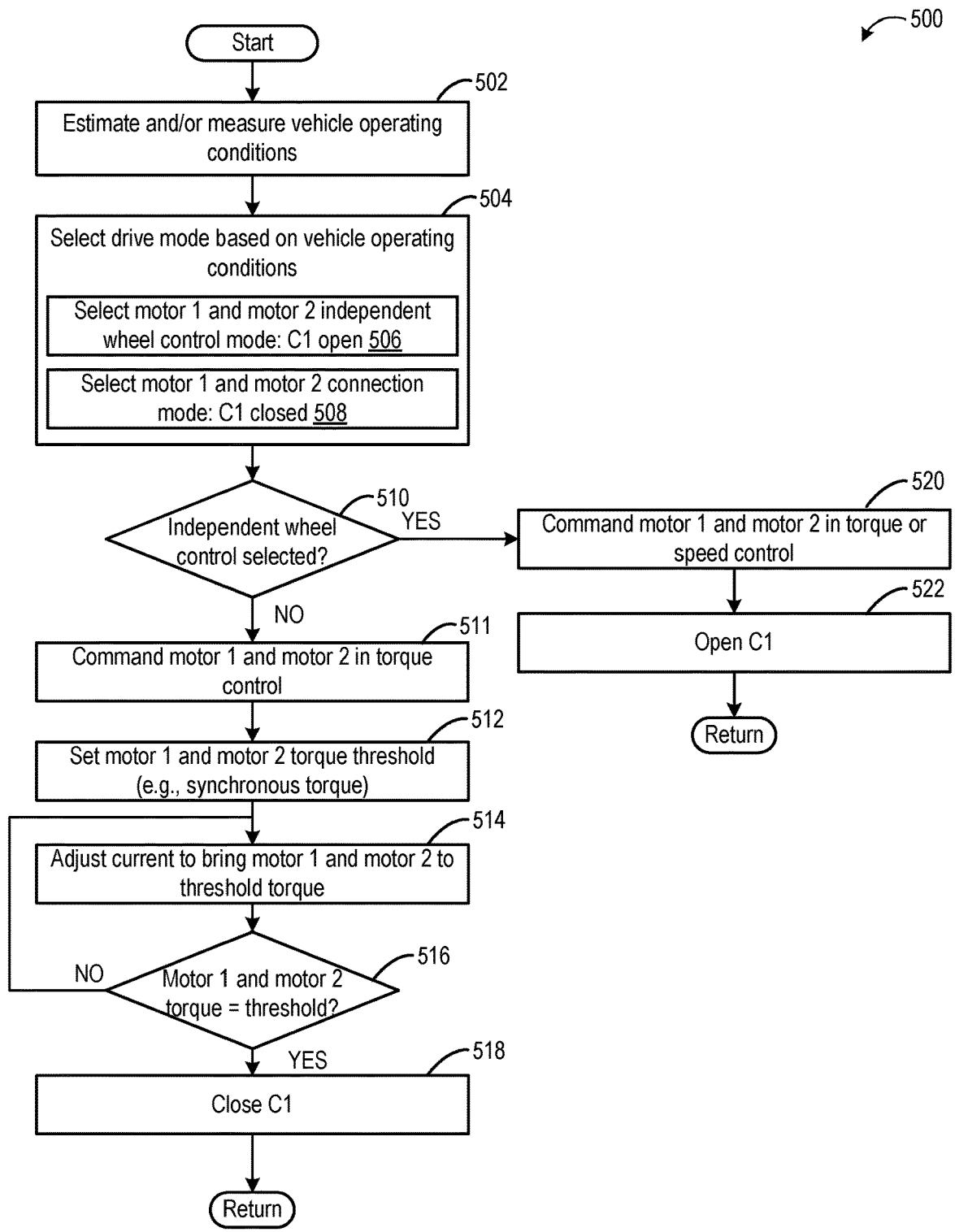
FIG. 5 shows a method for controlling a drive system for a vehicle such as the example drive system of FIG. 2.
Figure 6:
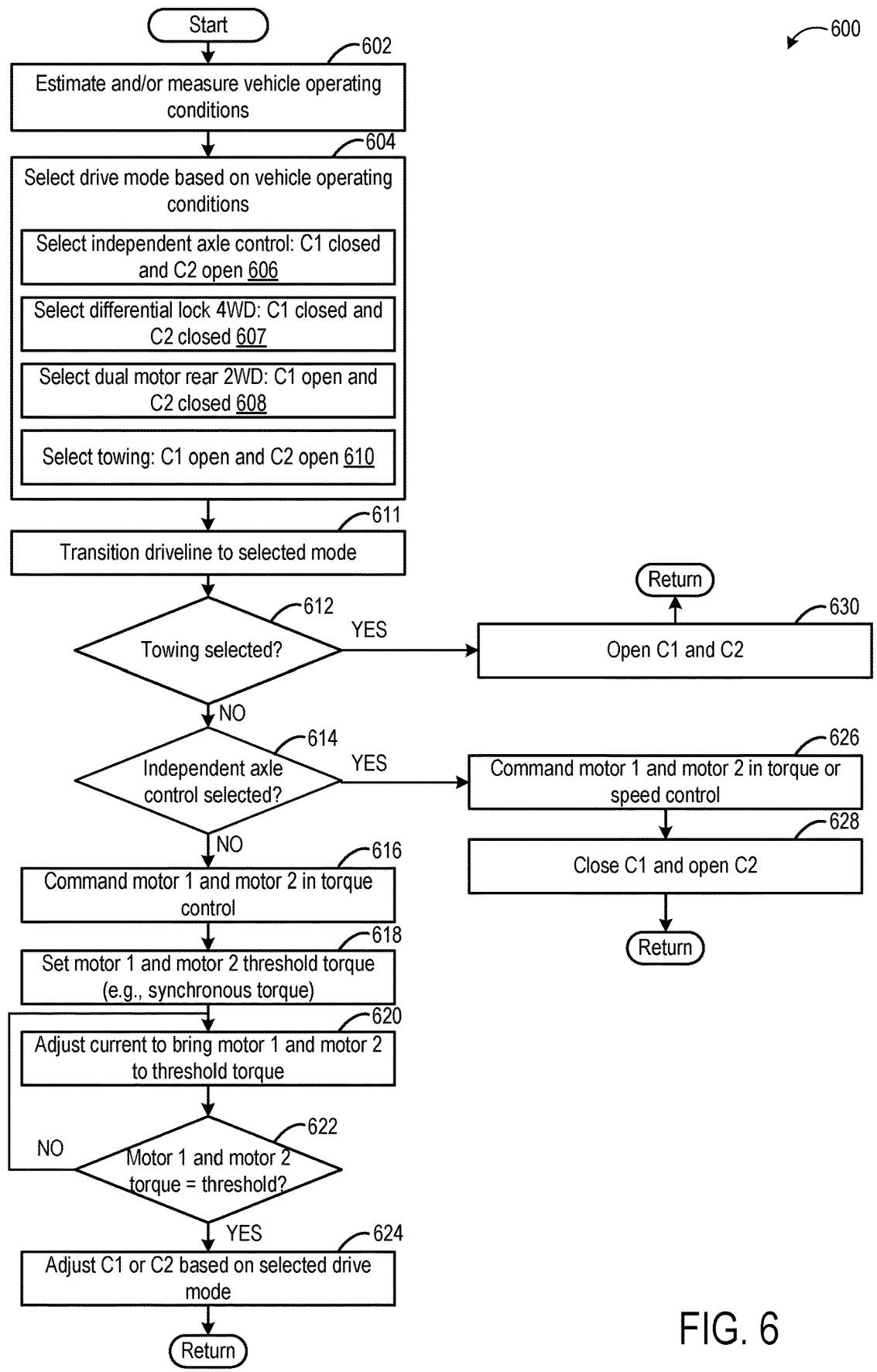
FIG. 6 shows a method for controlling a drive system for a vehicle such as the example drive system of FIG. 3A.
Figure 7:
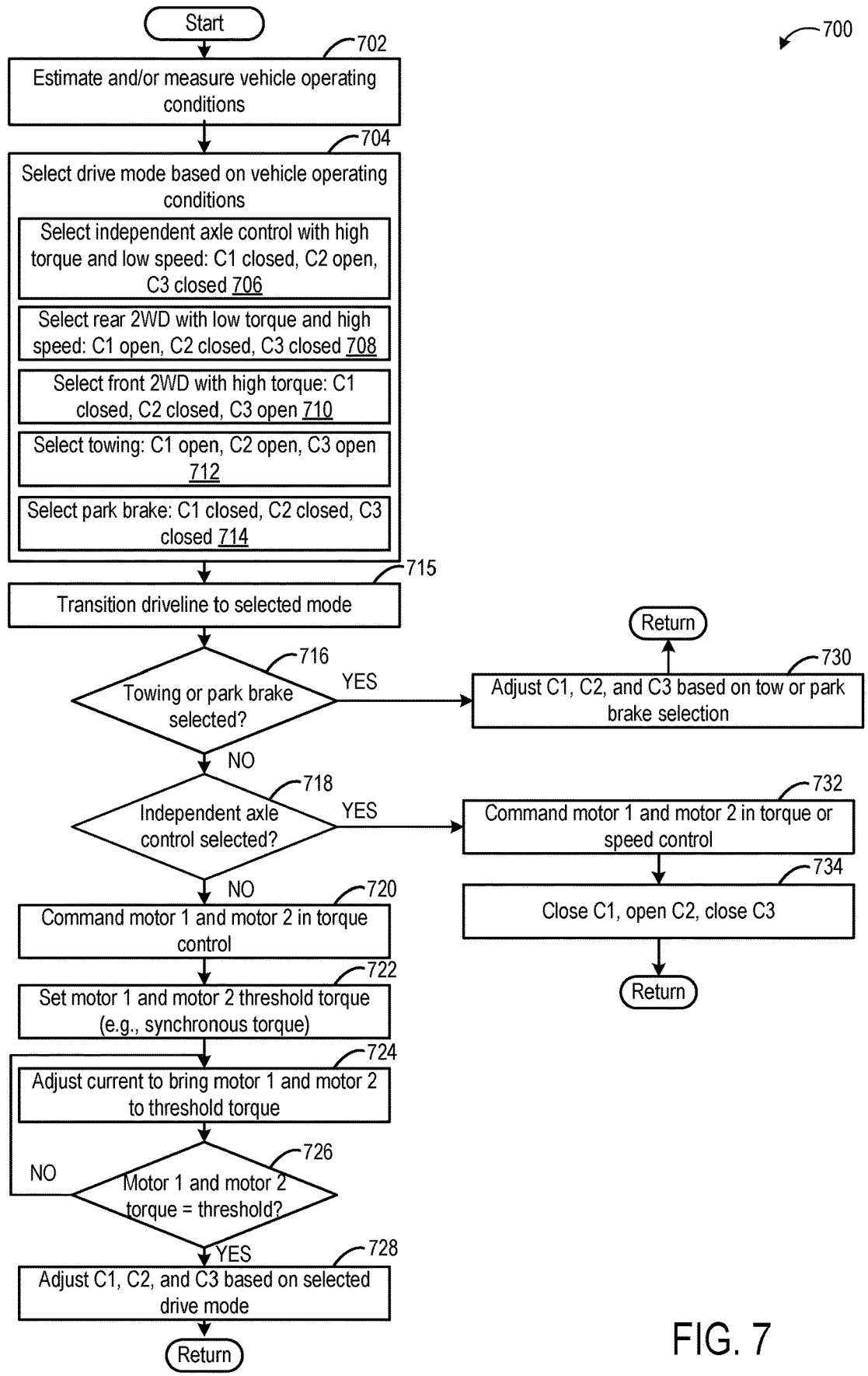
FIG. 7 shows a method for controlling a drive system for a vehicle such as the example drive system of FIG. 3B.
Figure 8:
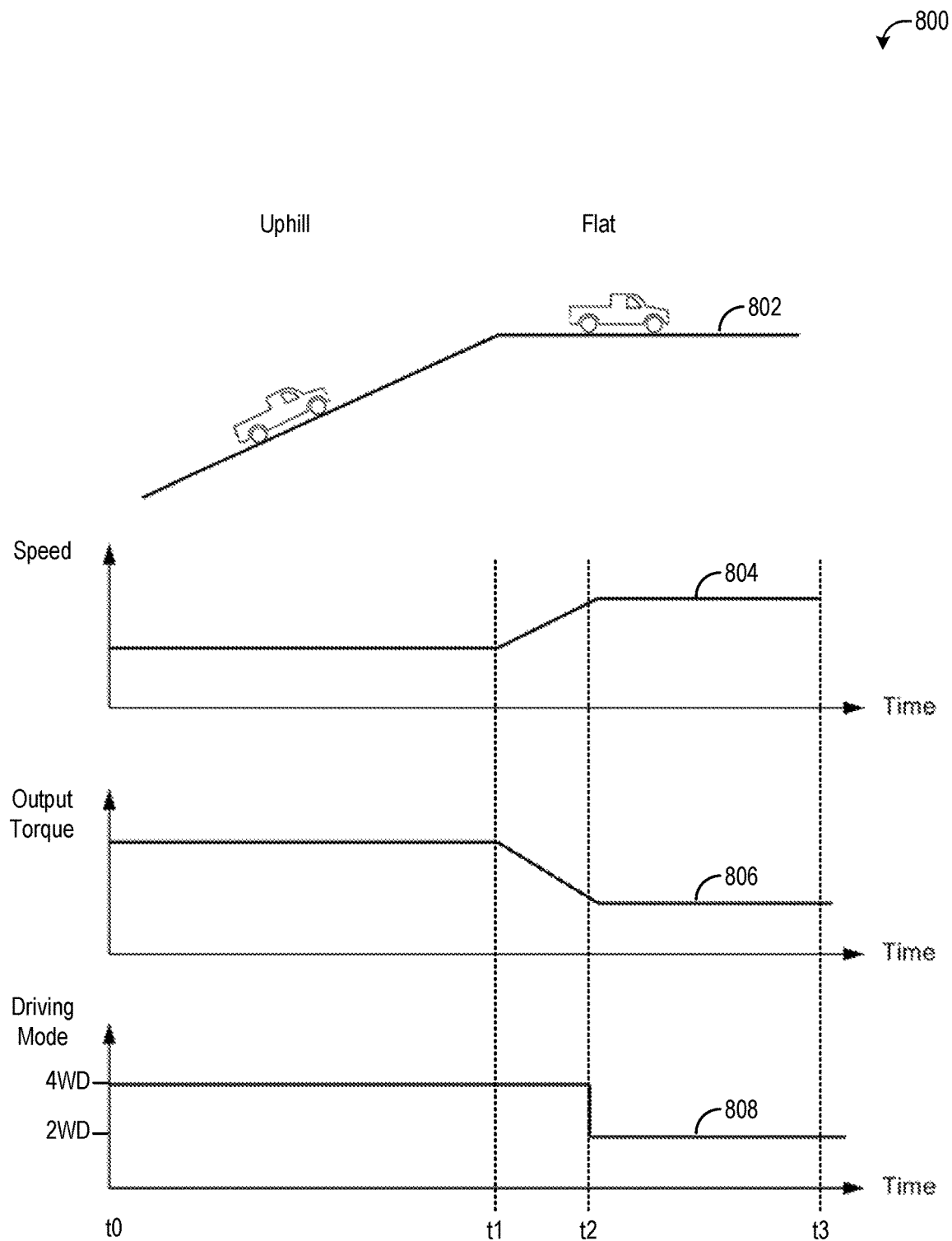
FIG. 8 shows a timing diagram illustrating an example prophetic operation of a duel electric motor driveline.

The following description relates to systems and methods for dual electric motor driveline control for a vehicle. A power output assembly for a vehicle may be arranged with two electric motors disposed with coaxial shafts that can be connected between them or the driveline using gears and clutches in different configurations, and optionally, the electric motors may be installed in the same housing. FIG. 1 is a schematic diagram illustrating an example assembly including a first motor connected to a first output shaft and a second motor connected to and in-line with the first motor via a planetary gear set. The planetary gear set may include shifting devices to realize two different ratios for the second motor. The assembly may include first and second clutches that may be engaged singly for realizing different driving modes. FIG. 2 is a schematic diagram illustrating an example assembly including a first motor driving a first output shaft via a first reduction gear set, a second motor driving a second output shaft via a second reduction gear set, and a clutch disposed axially between the first motor and the second motor. The clutch may be disengaged to enable independent torque or speed control of the first and second output shafts. The clutch may be engaged to enable the first and second output shafts to rotate at the same speed and powered by the sum of the first and second motor torques. FIG. 3A is a schematic diagram illustrating an example assembly including a first motor coupled to a first output shaft, a second motor coupled to a second output shaft, and first and second clutches that enable the first motor and the second motor to drive the second output shaft together or to drive the first output shaft and the second output shaft separately. FIG. 3B is a schematic diagram illustrating an example assembly including a third clutch for enabling the first motor and the second motor to drive the first output shaft together in addition to first and second clutches operating similarly to those described with reference to FIG. 3A. A control system may be configured to perform control routines to select and transition to one or more driving modes of the assembly based on operating conditions including motor control and clutch engagement. FIG. 4 is flow chart illustrating an example method for controlling the transition between driving modes for an assembly configured similarly to FIG. 1. FIG. 5 is a flow chart illustrating an example method for controlling the transition between driving modes for an assembly configured similarly to FIG. 2. FIG. 6 is flow chart illustrating an example method for controlling the transition between driving modes for an assembly configured similarly to FIG. 3A. FIG. 7 is a flow chart illustrating an example method for controlling the transition between driving modes for an assembly configured similarly to FIG. 3B. FIG. 8 is a timing diagram illustrating an example prophetic operation of a duel electric motor driveline.

Turning now to FIG. 1, a schematic diagram of an example dual motor electric driveline or assembly 100 is shown. In some examples, assembly 100 and following assemblies described herein may be included in an off-highway machine or other work vehicle. Assembly 100 may include a first electric motor or first motor 102 directly coupled to a first output shaft 106 and a second electric motor or second motor 104 coaxial (e.g., in-line) with the first motor 102. The assembly includes a second shaft 108 in line with the first output shaft 106. The assembly 100 may include a reduction gear set or planetary gear set 110. The planetary gear set 110 may include one or more clutches, shown as first clutch 120 and a second clutch 122, to realize different ratios for the second motor 104.

Assembly 100 and the other examples described herein may include a battery 170 as a power source. Energy may be stored in the battery 170, converted into electrical energy (e.g., current) and used to power the first motor 102 and the second motor 104. As one example, the first motor 102 and the second motor 104, and the motors of the other examples described herein, may be electric motors and/or a generators. A controller or control system 160 may adjust and control mechanical energy provided by the first motor 102 and second motor 104. In other words, the control system 160 may control a torque output of the first motor 102 and the torque output of the second motor 104. For example, the control system 160 may adjust an amount of current from the battery 170 to the first motor 102 and the second motor 104 to target a motor torque threshold. In another example, the control system 160 may be configured to selectively engage, selectively disengage, or otherwise communicate with components of the assembly 100 according to various modes of operation.

As an example, the first motor 102 and the second motor 104 may be enclosed in a housing. For example, the motors may be caseless such that first motor 102 and the second motor 104 may be enclosed in a common housing or housing 126 and share cooling and other components. As another example, the first and second motors may be independent such that they are arranged within separate housing such as external frames. Assembly 100 may include the first motor 102 arranged on a first side 152 of the housing 126, the first side 152 relative to an axial centerline 107 dividing the housing 126 into approximately equivalent halves. The second motor 104 may be arranged on a second, opposing, side 154 of housing 126. The planetary gear set 110 may be positioned between the first motor 102 and the second motor 104. In one example, the first clutch 120 may be positioned between the planetary gear set 110 and the second motor 104. The second motor 104 may be positioned between the first clutch 120 and the second clutch 122.

In one example, assembly 100 may be installed to drive an axle 132. The axle 132 may comprise a first axle half shaft 148 mechanically coupled to a second axle half shaft 150 via differential 134. The first output shaft 106 and, selectively, a second shaft 108 may drive the axle 132. The first axle half shaft 148 may be coupled to a first wheel 128 and the second axle half shaft 150 may be coupled to a second wheel 130. When driven, the axle 132 may rotate about an axis of rotation 138. In one example, the first side 152 of the housing 126 and therefore the first motor 102 may be adjacent to the axle 132. In other examples such as examples where the assembly is included in a gearbox or other system, the relative arrangement of the assembly may be different.

The first motor 102 includes a first stator 142 surrounding a first rotor 140 attached to the first output shaft 106. When current is provided to the first motor 102, the first rotor 140 and the first output shaft 106 coupled thereto may rotate about the axis of rotation 136. The second motor 104 includes a second stator 146 surrounding a second rotor 144. The second rotor 144 has a hollow shaft 118. The second rotor 144 may be selectively coupled to and selectively decoupled from the second shaft 108. When current is provided to the second motor 104, the second rotor 144 and the second shaft may rotate about axis of rotation 136. In one example, the planetary gear set 110 may be axially disposed between the first motor 102 and the second motor 104. The planetary gear set 110 includes a ring gear 114, a carrier 112 rotationally supporting a plurality of planetary gears 124, and a sun gear 116. The carrier 112 may be directly coupled to the first output shaft 106 and the first motor 102. The ring gear 114 may be directly coupled to ground such as to the housing 126. The sun gear 116 may be directly coupled to the second shaft 108. The first clutch 120 may be engaged to couple the second motor 104 to the carrier 112 and therefore directly to the first output shaft 106. The second clutch may be engaged to couple the second motor 104 to second shaft 108, and therefore the sun gear 116. The first stator 142 of the first motor 102 is a stationary assembly and the first rotor 140 attached to the first output shaft 106 rotates with respect to the first stator 142. Similarly, the second stator 146 is a stationary assembly and the second rotor 144 and selectively coupled second shaft 108 rotate with respect to the second stator 146.

As one example, the planetary gear set 110 may function as a power transfer mechanism to receive a rotational speed and torque (or mechanical power) from the second motor 104 and transmit it to the first motor 102 in such a manner that the torque and rotational speed are changed in accordance with the mechanics of the planetary gear train. As one example, assembly 100 includes the first clutch 120 for realizing a first gear ratio and the second clutch 122 for realizing a second gear ratio. The first clutch 120 and second clutch 122 may be engaged singly for realizing different driving modes. The first motor 102 being directly coupled to the output shaft may provide torque independently. For example, by opening the first clutch 120 and opening the second clutch 122, the second motor 104 may be disconnected from the carrier 112 and disconnected from the second shaft 108. Power to the second motor 104 may be shut-off and the first output shaft 106 may be driven by the first rotor 140 of the first motor 102 alone. As one example, driving the first output shaft 106 by the first motor 102 alone may be considered a first driving mode, such as a battery efficiency mode. In one example, the second rotor 144, having a hollow shaft, when coupled to the carrier 112, the second shaft 108 and sun gear 116 coupled thereto may rotate freely driven by the ring gear 114. When coupled to the carrier 112, the torque output from the second rotor 144 is added to the torque output from the first rotor 140 directly. By engaging the first clutch 120, with the second clutch 122 disengaged, the first and second motors may couple directly and provide torque in combination to the first output shaft 106. As one example, with the first clutch 120 engaged, a second gear (e.g., high speed, travel) may be realized. By engaging the second clutch 122, with the first clutch 120 disengaged, the second motor 104 may be coupled to second shaft 108. When coupled to the second shaft 108, the second motor 104 may drive the sun gear 116. The carrier 112 driven by the sun gear 116 may rotate at a lower speed. As one example, the carrier may rotate 2-3 times slower when driven by the sun gear 116. The first output shaft 106 may continue to rotate at the speed of the carrier. The torque output from the second rotor 144 is added to the torque output of the first rotor 140 via gear reduction, reducing the output speed of rotation and increasing the overall torque output. As one example, with the second clutch engaged, a first gear (e.g., low speed, high traction force) may be realized. The first motor 102 being directly coupled to the first output shaft 106 may provide continuous torque during a gearshift operation of the second motor 104 thereby achieving smooth gear change with reduced torque interruption. Since the shifting operation requires very little time, the first motor 102 may be used at the full peak performance. In particular, the shifting operation may include disengaging the second motor by opening the clutch, adjusting the speed of the second motor, and then closing again the clutch. For example, if the operation is a downshift, the second motor speed adjustment may including decelerating the second motor. If the operation is an upshift, the second motor speed adjustment may include accelerating the second motor. As one example, the shifting operation may take tenths of a second. However, with the first motor engaged, the shifting operation may be slightly slower, such as closer to one second, to improve smoothness and to reduce peak power at the second motor during the acceleration and deceleration. As one example, the second motor peak performance may be achievable for several tenths of a second and is therefore compatible with the first motor overload to compensate for the second motor.

Various types of clutches may be included in assembly 100. As one example, the first clutch 120 and the second clutch 122 may be a type of dog clutch with on/off control whereby the clutch may be engaged or disengaged when the first motor 102 and the second motor 104 have the same speed. As another example, the clutches may a type of synchronizer, which may allow for smoother engagement or disengagement. As another example, the clutches may be a type of friction clutch such as a multi-disc wet clutch. An advantage of the assembly arranged with the first output shaft 106 directly coupled to the first motor 102 is that simpler couplings such as dog clutches may be used without compromising the overall gear shift smoothness at the vehicle level. The first motor 102 may apply a torque output even during the time of gearshift operation when the second motor 104 is not driving the output. In some examples, the first clutch 120 and the second clutch 122 and the clutches included in the other examples described herein such as assembly 200, assembly 300 and assembly 350 may be biased into an engaged position (e.g., with a spring, etc.) and selectively disengaged (e.g., with application of pressurized hydraulic fluid, etc.). In some examples, the clutches may be biased into a disengaged position (e.g., with a spring, etc.) and selectively engaged (e.g., with application of pressurized hydraulic fluid, etc.).

The control system 160 may be electronically coupled to the first motor 102, the second motor 104, the first clutch 120 via a first clutch actuator 115, and the second clutch 122 via a second clutch actuator 117, and may send and receive signals therewith. Control system 160 may receive various signals from sensors 166 coupled to assembly 100, and send control signals to various actuators 168 coupled to the assembly. As one example, the control system 160 may send command signals relating to at least one of a target mode of operation, a target rotational speed, and a target rotation direction for the first motor 102 and the second motor 104. As one example, the control system 160 may be configured to selectively engage and selectively disengage the first clutch 120 and the second clutch 122 directly or by interacting with another component (e.g., a pump, a valve, a solenoid, a motor). The first motor 102 and the second motor 104 may be electrically coupled (e.g., by an electrical power transmission system).

The control system 160 includes a processor 162 and a memory 164. In some examples, the processor 162 is configured to execute computer code stored in the memory 164 to facilitate the activities described herein, such as described with regard to the operations of FIGS. 4-7. The memory 164 includes various actuation profiles corresponding to modes of operation (e.g., for the assembly 100, clutches 120, 122) according to examples described herein. The hardware and data processing components used to implement the various processes, operations, illustrative logics, logical blocks, modules and circuits described in connection with the embodiments disclosed herein may be implemented or performed with a general purpose single or multi-chip processor, a digital signal processor (DSP), an application specific integrated circuit (ASIC), a field programmable gate array (FPGA), or other programmable logic device, discrete gate or transistor logic, discrete hardware components, or any combination thereof designed to perform the functions described herein. A general-purpose processor may be a microprocessor, or, any conventional processor, controller, microcontroller, or state machine. A processor also may be implemented as a combination of computing devices, such as a combination of a DSP and a microprocessor, a plurality of microprocessors, one or more microprocessors in conjunction with a DSP core, or any other such configuration. In some embodiments, particular processes and methods may be performed by circuitry that is specific to a given function. The memory 164 (e.g., memory, memory unit, storage device) may include one or more devices (e.g., RAM, ROM, Flash memory, hard disk storage) for storing data and/or computer code for completing or facilitating the various processes, layers and modules described in the present disclosure. The memory 164 may be or include volatile memory or non-volatile memory, and may include database components, object code components, script components, or any other type of information structure for supporting the various activities and information structures described in the present disclosure. According to an exemplary embodiment, the memory 164 is communicably connected to the processor 162 via a processing circuit and includes computer code for executing (e.g., by the processing circuit or the processor 162) the one or more processes described herein. As one example, the control system 160 and components thereof, sensors 166, and actuators 168 may be included in the following assemblies described herein and may not be reintroduced.

Turning now to FIG. 2, a schematic diagram of a second example for a dual motor electric driveline or assembly 200 is shown. Assembly 200 may include a first electric motor or first motor 202 driving a first output shaft 206, a second electric motor or second motor 204 driving a second output shaft 208, and a clutch 230 for selectively coupling the first electric motor to the second electric motor. In one example, the second motor 204 may be coaxially aligned with the first motor 202 and the clutch 230 may be positioned axially between the first motor 202 and the second motor 204. In some examples, one or both of the first motor 202 and the second motor 204 may directly couple to their respective output shafts. In other examples, one or both of the first motor 202 and second motor 204 may drive their respective output shafts via reduction gears. Examples may include single speed or fixed reduction gears and multi-speed transmissions. As one example, assembly 200 may include a first reduction gear set or planetary gear set 210 and a second reduction gear set or second planetary gear set 220.

Assembly 200 includes a battery 170 as a power source. A controller or control system 160 may adjust and control mechanical energy provided by the first motor 202 and second motor 204. In other words, the control system 160 may control a torque output of the first motor 202 and the torque output of the second motor 204. For example, the control system 160 may adjust an amount of current from the battery 170 to the first motor 202 and the second motor 204 to target a motor torque threshold. In one example, the control system 160 may be configured to selectively engage, selectively disengage, or otherwise communicate with components of the assembly 200, including a clutch actuator 215 for operating the clutch 230, according to various modes of operation.

As an example, the first motor 202 and the second motor 204 may be enclosed in a housing. Similar to assembly 100, first motor 202 and the second motor 204 may be enclosed in a common housing or housing 232 and share components such as a cooling circuit and electrical connector box. As another example, the first and second motors may be arranged within individual housing including independent cooling and electrical assemblies. Assembly 200 may include the first motor 202 arranged on a first side 250 of the housing 232, the first side 250 relative to an axial centerline 207 dividing the housing 232 into approximately equivalent halves. The second motor 204 may be arranged on a second, opposing, side 252 of the housing 232. When included, the first planetary gear set 210 may be positioned between the first motor 202 and a first sidewall 254 of the housing 232. Similarly, the second planetary gear set 220 may be positioned between the second motor 204 and the second sidewall 256 of the housing 232. In one example, the clutch 230 may be positioned directly between the first motor 202 and the second motor 204 (e.g., with no other components positioned therebetween). As one example, the assembly 200 may be installed in an axle 258. In such an arrangement, the first motor 202 may provide a torque output via the first output shaft 206 (e.g., a left axle half shaft) to a first wheel 234 coupled thereto. The second motor 204 may provide a torque output via second output shaft 208 (e.g., a right axle half shaft) to a second wheel 236 coupled thereto.

The first motor 202 includes a first stator 244 surrounding a first rotor 242 coupled to a first motor shaft 260. In one example, the first stator 244 of the first motor 202 is a stationary assembly and the first rotor 242 rotates with respect to the first stator 244. When current is provided to the first motor 202, the first rotor 242 and the first motor shaft 260 coupled thereto may rotate about the axis of rotation 240. In some examples, the first motor shaft 260 may be coupled to the first output shaft 206 via the first planetary gear set 210. In other examples, the first rotor 242 of first motor 202 may be directly coupled to the first output shaft 206 (e.g., with no other components positioned therebetween). The second motor 204 includes a second stator 248 surrounding a second rotor 246 coupled to a second motor shaft 262. Similarly, the second stator 248 is a stationary assembly and the second rotor 246 rotates with respect to the second stator 248. When current is provided to the second motor 204, the second rotor 246 and the second motor shaft 262 coupled thereto may rotate about the axis of rotation 240. In some examples, the second motor shaft 262 may be coupled to the second output shaft 208 via the second planetary gear set 220. In other examples, the second rotor 246 of the second motor 204 may be directly coupled to the second output shaft 208.

In one example, when included in the assembly 200, the first planetary gear set 210 includes a ring gear 214, a carrier 212 rotationally supporting a plurality of planetary gears 218, and a sun gear 216. As one example, the ring gear 214 may be directly coupled to and grounded to the housing 232. The first output shaft 206 may provide an input torque to the sun gear 216 and output the rotation to the carrier 212. Similarly, the second planetary gear set 220 may include a ring gear 224 directly coupled to the housing 232. The second output shaft 208 may provide an input torque to the sun gear 226 and output a rotation to the carrier 222 via a plurality of planetary gears 228 mounted thereon. The gears of first planetary gear set 210 and second planetary gear set 220 may be sized and configured similarly or differently to realize similar or different gear ratios for the first motor 202 and second motor 204, respectively.

The clutch 230 may be engaged or disengaged for realizing different driving modes. As an example, in a first mode, by disengaging (e.g., opening) the clutch 230, the first motor 202 may provide a torque output to the first output shaft 206 and the second motor 204 may provide torque output to the second output shaft 208. The first mode may enable independent torque or speed control of the first wheel 234 and the second wheel 236 such that the wheels may rotate at different speeds and with different tractive force. In a second mode, by engaging (e.g., closing) the clutch 230, the first output shaft 206 coupled to the first motor 202 and the second output shaft 208 of the second motor 204 may be connected. With the motors connected, the first output shaft 206 and second output shaft 208 may rotate at the same speed powered by the sum of the first and second motor torques. As an example, engaging the clutch 230 may enable increasing power to a single wheel if the other wheel is slipping. Such a configuration, where the clutch may allow connecting the two motors, achieves a function similar to a mechanical differential lock.

Various types of clutches may be included in assembly 200. As one example, the clutch 230 may be a type of dog clutch with on/off control whereby the clutch may be engaged or disengaged when the first motor 202 and the second motor 204 have the same speed. Another example, the clutches may be a type of friction clutch such as a multi-disc wet clutch. In one example, an assembly configured similar to assembly 200 including a friction clutch may allow modulation of the torque flowing between left and right axle half shafts. Including a friction clutch may enable transferring some torque from the one of the motors to the other motor while the two wheels rotate at different speeds and therefore achieves a function of a limited slip differential.

Turning now to FIG. 3A, a schematic diagram of an example dual motor electric driveline or assembly 300 is shown. Assembly 300 may include a first electric motor or first motor 302 coupled to a first output shaft 306 via a first clutch 310 and second electric motor or second motor 304 directly coupled to a second output shaft 308. The first clutch 310 may enable the first motor 302 to be selectively disconnected from the first output shaft 306. In one example, the second motor 304 may be coaxially aligned with the first motor 302. The second clutch 312 may be positioned axially between the first motor 302 and the second motor 304. The second clutch 312 may enable the first output shaft 306 to be selectively connected to the second output shaft 308, thereby connecting the first motor 302 and the second motor 304. Assembly 300 may include the first motor 302 and the second motor 304 directly driving the first output shaft 306 and second output shaft 308, respectively. In other examples, one or both of the first motor 302 and second motor 304 may drive their respective output shafts via reduction gears. As one example, assembly 300 may include a first reduction gear set 319 and a second reduction gear set 321.

Assembly 300 may include a battery 170. A controller or control system 160 may adjust and control mechanical energy provided by the first motor 302 and second motor 304. In other words, the control system 160 may control a torque output of the first motor 302 and the torque output of the second motor 304. For example, the control system 160 may adjust an amount of current from the battery 170 to the first motor 302 and the second motor 204 to target a motor torque threshold. In one example, the control system 160 may be configured to selectively engage, selectively disengage, or otherwise communicate with components of the assembly 300, including a first clutch actuator 315 for operating the first clutch 310 and a second clutch actuator 317 for operating the second clutch 312, according to various modes of operation.

The first motor 302 and the second motor 304 may be enclosed in a housing. As an example, first motor 302 and the second motor 304 may be enclosed in a common housing or housing 314 and share components such as a cooling circuit and electrical connector box. As another example, the first and second motors may be arranged within separate housing such as external frames. Assembly 300 may include the first clutch 310 arranged on a first side 341 of the housing 314, the first side 341 relative to an axial centerline 307 dividing the housing 314 into approximately equivalent halves. The first clutch 310 may allow a first motor shaft 323 of the first motor 302 to disconnect from the first output shaft 306. The second motor 304 may be arranged on an opposing, second side 343 of the housing 314. The first motor 302 may be positioned between the first clutch 310 and the second motor 304. The second clutch 312 may be positioned directly between the first motor 302 and the second motor 304. The second clutch 312 may selectively couple the first motor shaft 323 to the second output shaft 308, and therefore the first motor 302 to the second motor 304.

The first motor 302 may include a first stator 340 surrounding a first rotor 338 coupled to the first motor shaft 323. The first stator 340 of the first motor 302 may be a stationary assembly and the first rotor 338 may rotate with respect to the first stator 340. When current is provided to the first motor 302, the first rotor 338 and the first motor shaft 323 coupled thereto may rotate about the axis of rotation 328. The second motor 304 may include a second stator 344 surrounding a second rotor 342 directly coupled to the second output shaft 308. Similarly, the second stator 344 may be a stationary assembly and the second rotor 342 may rotate with respect to the second stator 344. When current is provided to the second motor 304, the second rotor 342, and the second output shaft 308 coupled thereto may rotate about the axis of rotation 328.

In some examples, the assembly 300 may be installed in the center of a vehicle such as between two drive axles. In such an arrangement, the first output shaft 306 may couple to a first axle such as front axle 346 and the second output shaft 308 may couple to a second axle such as rear axle 348. The front axle 346 may comprise a first axle half shaft 320 coupled to a second axle half shaft 330 via first differential 334. The first axle half shaft 320 may be coupled to a first wheel 316 and the second axle half shaft 330 may be coupled to a second wheel 318. The rear axle 348 may comprise a third axle half shaft 326 coupled to a fourth axle half shaft 332 via second differential 336. The third axle half shaft 326 may be coupled to a third wheel 322 and the fourth axle half shaft 332 may be coupled to a fourth wheel 324. When driven, the front axle 346 and wheels 316, 318 may rotate about an axis of rotation 358 and the rear axle 348 and wheels 322, 324 may rotate about an axis of rotation 360. In one example, the first side 341 of the housing 314 may be adjacent to the front axle 346 and the second side 343 of the housing 314 may be adjacent to the rear axle 348. In other examples, the relative arrangement of the assembly may be different.

The first clutch 310 and the second clutch 312 may be engaged or disengaged for realizing different driving modes. As an example, in a first driving mode, by engaging the first clutch 310 and disengaging the second clutch 312, the first motor 302 may provide a torque output to the first output shaft 306 and the second motor 304 may provide torque output to the second output shaft 308. In one example, the first driving mode may enable independent torque or speed control of the front axle 346 and the rear axle 348. In a second driving mode, by engaging the first clutch 310 and the second clutch 312, the first output shaft 306 may be coupled to the first motor 302 and the first output shaft 306 and the second output shaft 308 may be connected to function as a single output shaft. The first output shaft 306 and second output shaft 308 may rotate at the same speed and driven by the sum of the first and second motor torques. As one example, engaging the first clutch 310 and second clutch 312 may enable assembly 300 to transfer all power to a single axle, for example, if the other axle is slipping. Such a configuration, where the first clutch 310 and the second clutch 312 are engaged, may achieve a function similar to a mechanical differential lock. For a third driving mode, by disengaging the first clutch 310 and engaging the second clutch 312, both the first motor 302 and the second motor 304 may provide a torque output to the second output shaft 308 while the first output shaft 306 is not driven. As one example, such a configuration may be selected for travelling on-road with lower power loss and increased drivability compared to driving with the first clutch 310 and the second clutch engaged. A fourth driving mode may include disengaging both of the first clutch 310 and the second clutch 312 for a neutral condition that may be advantageous in a towing scenario. An additional or alternative front axle drive configuration is described below with respect to FIG. 3B.

FIG. 3B shows an assembly 350 having a third clutch for additional flexibility. In one example, assembly 350 may be the same or similar to assembly 300 of FIG. 3A. Components of assembly 350 of FIG. 3B that are identical to components of assembly 300 are numbered the same and will not be reintroduced. For example, assembly 350 may include the first motor 302 selectively coupled to the first output shaft 306, the second motor 304 aligned coaxially with the first motor 302, the first clutch 310 for selectively coupling the first motor 302 to the first output shaft 306, and the second clutch 312 for connecting the first motor 302 and the second motor 304.

Assembly 350 may include a third clutch 362 for selectively coupling the second motor 304 to the second output shaft 308. Assembly 350 may include the second stator 344 surrounding the second rotor 342 coupled to a second motor shaft 325. The second stator 344 of the second motor 304 may be a stationary assembly and the second rotor 342 may rotate with respect to the first stator 340. When current is provided to the second motor 304, the second rotor 342 and the second motor shaft 325 coupled thereto may rotate about the axis of rotation 328. Closing the third clutch 362 may couple the second motor shaft 325 of the second motor 304 to the second output shaft 308, thereby enabling the second motor to drive the second output shaft. As one example, the third clutch 362 may be positioned within the housing 314 adjacent to the second sidewall 356. The second motor 304 may be positioned between the second clutch 312 and the third clutch 362. In one example, the third clutch 362 may selectively couple the second motor 304 to the rear axle 348 via the second output shaft 308. A control system 160 may adjust and control mechanical energy provided by the first motor 302 and second motor 304. In one example, the control system 160 may be configured to selectively engage, selectively disengage, or otherwise communicate with components of the assembly 350, including a first clutch actuator 315 for operating the first clutch 310, a second clutch actuator 317 for operating the second clutch 312, and a third clutch actuator 357 for operating the third clutch 362, according to various modes of operation.

Referring now to FIGS. 3A and 3B together, in some examples, a reduction gear set may be included between each motor and the corresponding axle. For example, the first reduction gear set 319 may be included between the first motor 302 and the front axle 346. As one example, the first reduction gear set 319 may be included inside the housing 314 between a first sidewall 354 and the first clutch 310. The second reduction gear set 321 may be included between the second motor 304 and the rear axle 348. In examples where a third clutch, e.g., third clutch 362, is included, the second reduction gear set 321 may be included inside the housing 314 and positioned between the third clutch 362 and a second sidewall 356. In examples, where a third clutch is not included, the second reduction gear set 321 may be included inside the housing 314 and positioned between the second motor 304 and the second sidewall 356. The gears of the first and second gear sets may be sized and configured similarly or differently to realize similar or different gear ratios for the first motor 302 and second motor 304, respectively. For example, the first reduction gear set 319 and the second reduction gear set 321 may have different gear ratios to balance the front and rear axles. First and second reduction gear sets configured in this way may be advantageous if the front and rear wheels are different sizes, as may be the case for off-road vehicles such as tractors.

As another example, having different gear ratios on the front axle 346 and the rear axle 348 may enable a function similar to a 2-speed transmission. For example, the first reduction gear set 319 may be configured to provide a first gear ratio and the second reduction gear set 321 may be configured to provide a second gear ratio. The first gear ratio may be configured to be higher than the second gear ratio such that the first gear ratio provides for high tractive force and the second gear ratio provides for higher speed. For example, the front axle 346 may have the higher ratio for providing higher tractive force. The rear axle 348 may have the lower ratio for providing higher wheel speed. In a first mode, with the first clutch 310 closed and the second clutch 312 open, the first motor 302 may drive the first output shaft 306 and the second motor 304 may drive the second output shaft 308. If included, the third clutch 362 may be closed (e.g., engaged) in the first mode to couple the second motor 304 to the second output shaft 308. In the first mode, the total force may be high due to torque output of the first motor 302 being multiplied by the large ratio and the speed low due to the top speed being the maximum for the first motor 302. In a second mode, with the first clutch 310 open and the second clutch 312 closed, the first motor 302 and the second motor 304 may both drive the rear axle 348. If included, the third clutch 362 may be closed in the second mode to couple the second motor 304 to the second output shaft 308. With the second mode utilizing a low gear ratio for the second output shaft 308, the total wheel torque may be lower than in the first mode but the speed may be higher. Such a configuration may be advantageous as a travel mode. If the third clutch 362 is included, an additional driving mode may be realized. With the first clutch 310 closed, the second clutch 312 closed, and the third clutch 362 open, the first motor 302 and the second motor 304 may drive the front axle 346 via the higher ratio while the rear axle 348 is not driven for an even higher traction force. First and second reduction gear sets configured in this way may provide flexibility for work vehicles that operate in off-road and on-road conditions. In some examples, the gear ratios of the front and rear axles may be incompatible and therefore not be driven at the same time. As an example, an assembly configured with the front axle 346 driven via a gear at a higher ratio and the rear axle 348 driven via gear at a lower ratio may enable engaging at once the first clutch 310, the second clutch 312, and, if included, the third clutch 362, as a park brake. For example, a machine may be designed to engage the clutches when the machine is off. As another example, if the clutches are wet clutches and the actuation system is properly defined to minimize excessively fast dynamics, engaging both the first and second (and third, if included) clutches at once may function as an emergency brake. An example mode of operation using of a park brake is given in FIG. 3B. As a further example, one or more battery efficiency driving modes may be realized by operating the assembly in one of the 2WD modes and stopping power to the motor of the not driven axle.

As described with respect to the above example assemblies, various types of clutches may be included in assembly 300 and assembly 350. As one example, the first clutch 310, the second clutch 312, and the third clutch 362 may be a type of dog clutch with on/off control whereby the clutch may be engaged or disengaged when the first motor 302 and the second motor 304 have the same speed. Another example, the clutches may be friction clutches such as a multi-disc wet clutches. Similar to assembly 200, assembly 300 and assembly 350 including a friction clutch may allow modulation of the torque flowing between front and rear axles. Including a friction clutch may enable transferring some torque from the one of the motors to the other motor while the two axles rotate at different speeds and therefore achieves a function of a limited slip differential.

Example methods for operating a dual electric motor drive system are shown in FIGS. 4-7. FIG. 4 shows an example of a method 400 for operating a dual electric motor drive system configured similarly to assembly 100 of FIG. 1. For example, the method 400 may be implemented in a vehicle with a drive system including a first motor, a second motor coaxially aligned with the first motor, at least one gear reduction set, a first clutch (e.g. one or more dog clutches) for the first motor to couple to the second motor, and a second clutch for coupling the second motor to a reduction gear set. FIG. 5 shows an example of a method 500 for operating a dual electric motor drive system configured similarly to assembly 200 in FIG. 2. FIG. 6 shows an example of a method 600 for operating a dual electric motor drive system configured similarly to assembly 300 in FIG. 3A. FIG. 7 shows an example of a method 700 for operating a dual electric motor drive system configured similarly to assembly 350 in FIG. 3B. Instructions for carrying out the method 400, method 500, method 600, and method 700 may be executed by a controller, such as the control system 160 of FIG. 1, based on instructions stored on a memory of the controller and in conjunction with signals received from sensors of the drive system, such as the sensors described above with reference to FIG. 1. The controller may employ actuators of the system to adjust drive system operation, according to the methods described below. For example, the controller may select a driving mode based on operating conditions and transition the drive system to the selected mode. The controller may command the operation of one or more of the first motor, the second motor, and the clutches of the drive system to transition to the selected mode. Further, the controller may include memory-holding instructions executable via a processor, as previously discussed.

At 402, the method includes estimating and/or measuring one or more vehicle operating conditions. For example, a vehicle stopped condition, a status of the first motor (e.g., on or off), a status of the second motor (e.g., on or off), a clutch configuration, vehicle speed, torque demand, etc. may be determined.

At 404, the method 400 includes selecting a driving mode based on vehicle operating conditions and desired performance. For instance, a single motor may be used when slow acceleration is required or when maneuvering slowly. Both motors connected via gear reduction (e.g., a first speed) may be used when climbing up a steep slope or for fast acceleration, or to push against a load such as in the case of off-highway machines. Both motors directly connected may be used at higher speed (e.g., a second speed) when more power than a single motor is desired such as in the case of driving uphill. In some examples, driving mode selection may be determined by a vehicle operator selecting a mode, e.g., by actuating a button. In some examples, the driving mode may be selected by the controller. In some examples, the driving mode may be selected by a combination of vehicle operator input and controller signaling.

Three driving modes may be selected from in the method 400, one mode being operable at a time. At 406, the method 400 may include selecting a single motor mode, or a first mode, where the first motor drives an output shaft such as an output shaft driving an axle. In the first mode, the second motor may not provide an output torque and the second output shaft may not be driven. The single motor mode may include both of the first clutch and the second clutch actuated in an open (e.g., disengaged) position. As one example, the single motor mode may be a battery efficiency mode and selected based on a battery state of change. As another example, the method may include selecting the first mode responsive to a sensor signal indicating a second motor temperature hotter than a threshold temperature. At 408, the method 400 may include selecting a two motor travel mode, or a second mode, where the first motor and the second motor drive the output shaft. In the second mode, the first and second motors may be connected and the first and second motor torques summed on the output shaft, enabling higher speed travel. As one example, the second mode may include the first clutch in a closed position and the second clutch in an open position. As one example, the method 400 may include selecting the two motor travel mode responsive to a sensor signal indicating an increasing speed request. At 410, the method 400 may include selecting a two motor traction mode, or a third mode, where the second motor drives a second shaft coupled to the output shaft via gear reduction. In the third mode, the second motor may provide torque via a reduction gear set, reducing the speed and multiplying the torque of the output. The sum of the first and second motor torques drives the output shaft, producing a low speed, high traction force. As one example, the third mode may include the first clutch in an open position and the second clutch in a closed position. As one example, the method 400 may include selecting the third mode responsive to a sensor signal indicating an increasing torque request.

At 412, the method 400 includes transitioning to a selected mode. As one example, a transition may be based on the selected driving mode and the vehicle operating conditions. For example, the transition from vehicle startup may be different from the transition between driving modes. As another example, transitioning from a two motor driving mode (e.g., traction or travel) to a single motor driving mode may be different from transitioning in the other direction. As another example, the transition may be different based on the type or types of clutches used in the drive system. For example, transitioning between driving modes for a drive system configured with one or more dog clutches may be different from transitioning for a drive system configured one or more synchronizer or friction-type clutches.

As one example, if the system is configured with one or more dog clutches, the transition protocol may include disengaging the dog clutch, synchronizing the motor speed (e.g., acceleration or deceleration) to match the new mode using electric power, and engaging the dog clutch when the speed of the first and second shafts are within a small window of tolerance, e.g., within a threshold speed. If the system is configured with synchronizer clutches, the operation may similar to an operation for dog clutches with the synchronizer additionally contributing to the motor synchronization (e.g., by dragging it) such that the window of tolerance may be larger. As another example, if friction clutches are used, the first and second clutches may be controlled to smoothly engage a driving mode and disengage the other driving mode by overlapping the two operations, and the motor speed and/or motor torque may be controlled during the shift to facilitate the operation. As one example, the method 400 illustrates a transition protocol.

At 414, the method 400 includes determining whether the single motor mode is selected. If the single motor mode is selected, at 416 the method 400 includes commanding the first motor in torque or speed control. Current to the second motor may be stopped. At 418, the method includes opening the first clutch and opening the second clutch. With the first motor commanded and the first and second clutches open, the first motor may drive the output shaft.

If at 414, the single motor mode is not selected, the method 400 may include determining the two motor travel or the two motor traction mode is selected at 420. At 421, the first or second clutch may be adjusted based on current operating conditions. For example, if the transition is from the two motor travel mode to the two motor traction mode, the first clutch may be opened. At 422, the method 400 includes commanding the first motor and the second motor in torque control. As one example, the method 400 may include synchronizing the first motor and the second motor (e.g. similar motor speeds) prior to connecting the first and second motors. Therefore, at 424, a first motor threshold torque and a second motor threshold torque may be set for the first and second motors, respectively. As one example, the first motor threshold torque and the second motor threshold torque may be the same amount. At 426, the method 400 may include adjusting the current to bring the first motor and the second motor to their respective threshold torques. Adjusting may include increasing current to one of the motors and decreasing current to the other motor, or increasing, or decreasing to both. At 428, the method 400 includes determining whether the first motor torque and the second motor torque are equal to the threshold torque. If no, the method 400 continues to adjust current to target the threshold. For example, the method 400 may include adjusting current to one or both motors using feedback control from one or more sensors. If yes, the method includes adjusting the clutches based on the selected driving mode at 430. If the transition is to the two motor traction mode, the method 400 may include opening the first clutch and closing the second clutch. If the transition is to the two motor travel mode, the method 400 may include closing the first clutch and opening the second clutch.

As an example transition, the drive system may be operating in the single motor mode. For example, the first clutch and the second clutch are open, the first motor is driving the output shaft, and the second motor is not receiving any current. Responsive to an increasing torque demand signal, the controller may transition the vehicle to the two motor traction mode. To execute the transition, the controller may command the first motor and the second motor in torque control. The controller may determine the torque demand and set the first motor threshold torque at a first level (e.g., 155 lb-ft). The first and second motors may be connected when they have a similar speed, therefore the second motor threshold torque may be set to the same or similar level (e.g., 155 lb-ft). The controller adjusts current to the first and second motors to target their respective threshold torques. When the first motor torque is equal to the first motor threshold torque and the second motor torque is equal to the second motor threshold torque, the controller may actuate the second clutch to connect the first motor and second motor. In this way, the first and second motor are connected with the second motor driving the second shaft via gear reduction, transitioning the drive system to a high traction, low speed driving mode. The transition may be smooth and with minimal torque interruption due to the first motor providing torque during the gear shifting operation.

FIG. 5 shows an example of a method 500 for operating a dual electric motor drive system configured similarly to assembly 200 of FIG. 2. For example, the method 500 may be implemented in a vehicle with a drive system including a first motor directly coupled to a first output shaft, a second motor directly coupled to a second output shaft, the second motor coaxially aligned with the first motor, a clutch (e.g. one or more dog clutches) for the first motor to selectively couple to the second motor, and optionally one or more reduction gear sets. For example, the drive system may be positioned in an axle with the first output shaft driving a first wheel and the second output shaft driving to a second wheel.

At 502, the method includes estimating and/or measuring one or more vehicle operating conditions. For example, a vehicle stopped condition, a status of the first motor (e.g., on or off), a status of the second motor (e.g., on or off), a clutch configuration, vehicle speed, wheel speed, torque demand, etc. may be determined.

At 504, the method 500 includes selecting a driving mode based on vehicle operating conditions and desired performance. In some examples, driving mode selection may be determined by a vehicle operator selecting a mode, e.g., by actuating a button. In some examples, the driving mode may be selected by the controller. In some examples, the driving mode may be selected by a combination of vehicle operator input and controller signaling. Two driving modes may be selected from in method 500, one mode being operable at a time. At 506, the method 500 may include selecting an independent wheel control mode, or first mode, where the first motor drives the first output shaft such as connected to a left wheel via an axle half shaft and the second motor drives the second output shaft such as connected to a right wheel, similarly. In the independent wheel control mode, the first and second motors may rotate at different speeds and control the left and right wheels of the axle independently. The first mode may include the clutch in an open (e.g., disengaged) position. At 508, the method 500 may include selecting a first and second motor connection mode, or second mode, where the first and second shafts are connected thereby connecting the torque outputs of the first motor and the second motor. In the first and second motor connection mode, the ability to transfer of all tractive power to a single wheel is enabled. As one example, the second mode may include the clutch in a closed position. As one example, the method 500 may include selecting the first and second motor connection mode responsive to a sensor signal indicating a loss of traction at a wheel.

In one example, controlling a transition to the first and second motor connection mode may be different from transitioning to the independent wheel control mode. For example, the first and second motor torques may be synchronized prior to motor connection. As another example, the transition may be different based on the type or types of clutches used in the drive system. For example, transitioning between driving modes for a drive system configured with one or more dog clutches may be different from transitioning for a drive system configured one or more synchronizer or friction-type clutches. Therefore, at 510, the method 500 may include determining whether independent wheel control is selected. If the method 500 determines independent wheel control is selected, the method may include commanding the first motor and the second motor in torque or speed control at 520. At 522, the method may include opening the first clutch.

If at 510, independent wheel control is not selected, at 511 the method may include commanding the first and second motor in torque control. As one example, the method 500 may include synchronizing the first motor and the second motor prior to connecting the first and second motors. Therefore, at 512, a first motor threshold torque and a second motor threshold torque may be set for the first and second motors, respectively. As one example, the first motor threshold torque and the second motor threshold torque may be the same amount. At 514, the method 500 may include adjusting the current to bring the first motor and the second motor to their respective threshold torques. Adjusting may include increasing current to one of the motors and decreasing current to the other motor, or increasing, or decreasing current to both. At 516, the method 500 may include determining whether the first motor torque and the second motor torque are equal to the threshold torque. If no, the method 500 may continue to adjust current to target the threshold. For example, the method 500 may include adjusting current to one or both motors using feedback control from one or more sensors. If yes, at 518 the method 500 may include closing the clutch.

As an example transition, the drive system may be operating in the independent wheel control mode. For example, the clutch is open, the first motor is driving a left wheel coupled to the first output shaft, and the second motor is driving a right wheel coupled to the second output shaft. Responsive to an indication of the left wheel slipping, the controller may transition the vehicle to the first and second motor connection mode. To execute the transition, the controller may command the first motor and the second motor in torque control. The controller may maintain the first motor at the present torque output (e.g., a first threshold, 110 lb-ft). The first and second motors may be connected when they have a similar speed, therefore the second motor threshold torque may be set to the same or similar level (e.g., the first threshold, 110 lb-ft). The controller may adjust current to the second motor to target the first threshold torque and may adjust current to the first motor to maintain the first threshold torque. When the first motor torque is equal to the first threshold torque and the second motor torque is equal to the first threshold torque, the controller may actuate the clutch to connect the first motor and second motor. Coupled in this way, the first and second motors may drive the axle with the combined torque output for a function similar to a mechanical differential lock.

FIG. 6 shows an example of a method 600 for operating a dual electric motor drive system configured similarly to assembly 300 of FIG. 3A. For example, the method 600 may be implemented in a vehicle with a drive system including a first motor coupled to a first output shaft, a second motor directly coupled to a second output shaft, the second motor coaxially aligned with the first motor, a first clutch (e.g. one or more dog clutches) for the first motor to selectively couple to a first output shaft and a second clutch for the first motor to couple to the second output shaft and therefore to the second motor. For example, the drive system may be included in the center of a vehicle with the first output shaft driving a front axle and the second output shaft driving a rear axle. Additionally or alternatively, the method 600 may be executed in a vehicle including one or more gear reduction sets. A similar drive system including reduction gear sets and a third clutch is described below with respect to FIG. 7.

At 602, the method includes estimating and/or measuring one or more vehicle operating conditions. For example, a vehicle stopped condition, a status of the first motor (e.g., on or off), a status of the second motor (e.g., on or off), vehicle speed, wheel speed, torque demand, etc. may be determined.

At 604, the method 600 includes selecting a driving mode based on vehicle operating conditions and desired performance. In some examples, driving mode selection may be determined by a vehicle operator selecting a mode, e.g., by actuating a button. In some examples, the driving mode may be selected by the controller. In some examples, the driving mode may be selected by a combination of vehicle operator input and controller signaling. Four driving modes may be selected from in the method 600, one mode being operable at a time. At 606, the method 600 may include selecting an independent axle control mode, or a first mode, where the first motor drives the front axle via the first output shaft and the second motor drives rear axle via the second output shaft. In the independent axle control mode, the first and second motors may rotate at different speeds and control the front and rear axles independently. The first mode may include the first clutch in a closed position, coupling the first motor to the first output device. The second clutch may be open, disconnecting the first output shaft and the second output shaft. At 607, the method 600 may include selecting a 4WD differential lock (or 4WD lock) mode, or a second mode, where the first motor and the second motor drive the first output shaft connected to the second output shaft. In the 4WD lock mode, the ability to transfer of all tractive power to a single axle may be enabled. As one example, the second mode may include the first clutch in a closed position and the second clutch in an open position. As one example, the method 600 may include selecting the 4WD lock mode responsive to a sensor signal indicating a loss of traction at a wheel or an axle. At 608, the method 600 may include selecting a dual motor rear 2WD mode, or a third mode, where the first motor and the second motor drive the rear axle via the second output shaft. The third mode may include the first clutch in an open position and the second clutch in a closed position. As one example, the method 600 may include selecting the rear 2WD driving mode responsive to a sensor signal indicating on-road travel. At 610, the method 600 may include selecting a towing mode, or a fourth mode. The towing mode may include the first clutch in an open position and the second clutch in an open position.

At 611, the method 600 includes transitioning to a selected mode. As one example, a transition may be based on the selected driving mode and the vehicle operating conditions. For example, the transition from vehicle startup may be different from the transition between driving modes. As another example, transitioning from independent axle control to a mode including the first and second motors driving an output together may be different from transitioning in the other direction.

At 612, the method 600 includes determining whether the towing mode is selected. If the towing mode is selected, the method 600 may include opening the first and second clutch at 630.

At 612, if towing mode is not selected, the method 600 may include determining whether independent axle control is selected at 614. If the method 600 determines independent axle control is selected, the method 600 may include commanding the first motor and the second motor in torque or speed control at 626. At 628, the method may include closing the first clutch and opening the second clutch.

At 614, if independent axle control is not selected, the method 600 may include commanding the first and second motor in torque control at 616. As one example, the method 600 may include synchronizing the first motor and the second motor (e.g. similar motor speeds) prior to connecting the first and second motors. Therefore, at 618, a first motor threshold torque and a second motor threshold torque may be set for the first and second motors, respectively. As one example, the first motor threshold torque and the second motor threshold torque may be the same amount. At 620, the method 600 may include adjusting the current to bring the first motor and the second motor to their respective threshold torques. Adjusting may include increasing current to one of the motors and decreasing current to the other motor, or increasing, or decreasing current to both. At 622, the method 600 may include determining whether the first motor torque and the second motor torque are equal to the threshold torque. If no, the method 600 may continue to adjust current to target the threshold at 620. For example, the method 600 may include adjusting current to one or both motors using feedback control from one or more sensors. If yes, the method 600 may include adjusting the first and second clutches based on the selected driving mode at 624. For example, if 4WD lock is selected, the method 600 may include closing the first clutch and closing the second clutch. If the rear 2WD is selected, the method 600 may include opening the first clutch and closing the second clutch.

As an example transition, the drive system may be operating in the independent axle control mode. For example, the first clutch is closed, the second clutch is open, the first motor is driving the front axle coupled to the first output shaft, and the second motor is driving the rear axle coupled to the second output shaft. Responsive to an indication of the front axle slipping, the controller may transition the vehicle to the 4WD lock mode. To execute the transition, the controller may command the first motor and the second motor in torque control. The controller may maintain the first motor at the present torque output (e.g., a first threshold, 100 lb-ft). The first and second motors may be connected when they have a similar speed, therefore the second motor threshold torque may be set to the same or similar level (e.g., the first threshold, 100 lb-ft). The controller may adjust current to the second motor to target the first threshold torque and may adjust current to the first motor to maintain the first threshold torque. When the first motor torque is equal to the first threshold torque and the second motor torque is equal to the first threshold torque, the controller may close the second clutch to connect the first and second shafts. Coupled in this way, the first and second motors may drive the connected output shafts with the combined torque output for a function similar to a locked center differential.

FIG. 7 shows an example of a method 700 for operating a dual electric motor drive system configured similarly to assembly 350 of FIG. 3B. For example, the method 700 may be implemented in a vehicle with a drive system including a first motor coupled to a first output shaft, a second motor directly coupled to a second output shaft, the second motor coaxially aligned with the first motor, a first clutch for the first motor to selectively couple to a first output shaft, a second clutch for the first motor to couple to the second output shaft and therefore the second motor, and a third clutch for the second motor to selectively couple to the second output shaft. The drive system may include a first and a second gear reduction set for the first and second motors, respectively. The drive system may be included in the center of a vehicle with the first motor driving a front axle via the first output shaft at a higher gear ratio and the second output shaft driving a rear axle via the second output shaft at a lower gear ratio. The method may include the first and second motors driving the rear axle together for a higher speed mode. The method may include the first and second motors driving the front axle together for a higher traction mode. The method may include the first and second motors driving the axles separately for independent axle control. Additionally, the drive method may include a park brake mode and a neutral (e.g., towing) mode.

At 702, the method includes estimating and/or measuring one or more vehicle operating conditions. For example, a vehicle stopped condition, a status of the first motor (e.g., on or off), a status of the second motor (e.g., on or off), a clutch configuration, vehicle speed, wheel speed, torque demand, etc. may be determined.

At 704, the method 700 includes selecting a driving mode based on vehicle operating conditions. In some examples, driving mode selection may be determined by a vehicle operator selecting a mode, e.g., by actuating a button. In some examples, the driving mode may be selected by the controller. In some examples, the driving mode may be selected by a combination of vehicle operator input and controller signaling. Five driving modes may be selected from in method 700, one mode being operable at a time. At 706, the method 700 may include selecting an independent axle control mode with high torque and low speed, or a first mode. In the first mode, the first motor may drive the front axle and the second motor may drive the rear axle. The first motor torque is multiplied by a large ratio producing high total force and low speed. The first mode may include the first clutch in a closed position, coupling the first motor to the first output shaft. The second clutch may be open, disconnecting the first output shaft and the second output shaft. The third output device may be closed, coupling the second motor to the second output shaft. At 708, the method 700 may include selecting a rear 2WD driving mode with low torque and high speed or a second mode. In the second mode, the first motor and the second motor may drive the rear axle. The output torque is multiplied by a low ratio producing lower torque and higher speed. The second mode may include the first clutch in an open position, the second clutch in a closed position, and the third clutch in a closed position. As one example, the method 700 may include selecting the rear 2WD driving mode responsive to a sensor signal indicating on-road travel. At 710, the method 700 may include selecting a front 2WD mode drive with higher torque or a third mode. In the third mode, the first motor and the second motor may drive the front axle via the higher gear ratio for greater tractive force. The front 2WD mode may include the first clutch in a closed position, the second clutch in a closed position, and the third clutch in an open position. As one example, the method 700 may include selecting the third mode responsive to a sensor signal indicating a loss of traction at the rear axle. At 712, the method 700 may include selecting a towing mode or a fourth mode. The fourth mode may include the first, second and third clutches in an open position. At 714, the method 700 may include selecting a park brake mode or a fifth mode. The fifth mode includes the first, second, and third clutches in a closed position.

At 715, the method 700 includes transitioning to a selected mode. As one example, a transition may be based on the selected driving mode and the vehicle operating conditions. For example, the transition from vehicle startup may be different from the transition between driving modes. As another example, transitioning from a higher traction mode to a higher speed mode may be different from transitioning in the other direction.

At 716, the method 700 includes determining whether one of the towing mode and the park brake mode is selected. If one of the towing mode and park brake mode is selected, the method 700 may include adjusting the clutches based on towing or park brake selection at 730. As one example, towing mode selection may include opening the first clutch, opening the second clutch, and opening the third clutch. As another example, park brake mode selection may include closing the first clutch, closing the second clutch, and closing the third clutch.

At 716, if one of the towing mode and the park brake mode is not selected, the method 700 may include determining whether independent axle control is selected at 718. If the method 700 determines independent axle control is selected, the method 700 may include commanding the first motor and the second motor in torque or speed control at 732. At 734, the method may include closing the first clutch, opening the second clutch, and closing the third clutch.

At 718, if independent axle control is not selected, the method 700 may include commanding the first and second motors in torque control at 720. As one example, the method 700 may include synchronizing the first motor and the second motor prior to connecting the first and second motors. Therefore, at 722, a first motor threshold torque and a second motor threshold torque may be set for the first and second motors, respectively. As one example, the first motor threshold torque and the second motor threshold torque may be the same amount. At 724, the method 700 may include adjusting the current to bring the first motor and the second motor to their respective threshold torques. Adjusting may include increasing current to one of the motors and decreasing current to the other motor, or increasing, or decreasing current to both. At 726, the method 700 may include determining whether the first motor torque and the second motor torque are equal to the threshold torque. If no, the method 700 may continue to adjust current to target the threshold at 724. For example, the method 700 may include adjusting current to one or both motors using feedback control from one or more sensors. If yes, the method 700 may include adjusting the first, second and third clutches based on the selected driving mode at 728. For example, if front 2WD with higher torque is selected, the method 700 may include closing the first clutch, closing the second clutch, and opening the third clutch. If the rear 2WD with high speed is selected, the method 700 may include opening the first clutch, closing the second clutch, and closing the third clutch.

As an example transition, the drive system may be operating in the independent axle control mode with high torque and low speed. For example, the first clutch is closed, the second clutch is open, and the third clutch is closed such that the first motor is driving the front axle coupled to the first output shaft, and the second motor is driving the rear axle coupled to the second output shaft. Responsive to an indication of the vehicle entering an on-road area, the controller may transition the vehicle to the rear 2WD with high-speed mode. To execute the transition, the controller may command the first motor and the second motor in torque control. In first mode, the top speed may be determined by the first motor. The controller may set the first motor threshold torque to a first threshold (e.g., 185 lb-ft). The first and second motors may be connected when they have a similar torque output; therefore, the second motor threshold torque may be set to the same or similar level (e.g., the first threshold). The controller may adjust current to the first motor and the second motor to target the first threshold torque. When the first motor torque is equal to the first threshold torque and the second motor torque is equal to the first threshold torque, the controller may open first clutch while closing the second clutch to connect the first motor to the second output shaft. Coupled in this way, the combined torque output of the first and second motors multiplied by the lower gear ratio may drive the rear axle for higher speed travel.

FIG. 8 is a timing diagram illustrating a sequence of actions performed within a method for operating a dual electric motor driveline system. The method for operating a dual electric motor driveline system may be the same or similar to the series of actions described above with reference to FIG. 7. The dual motor electric driveline may be the same or similar to the assembly 350 shown in FIG. 3B. Instructions for performing the method described in timing diagram 800 may be executed by a controller (e.g., control system 160) based on instructions stored on a memory of the controller and in conjunction with sensory feedback received from components of the driveline system (e.g., sensors 166) described above with respect to FIG. 3B. In the prophetic example, the controller determines a driving mode transition is desired and transitions the driveline from a first driving mode to a second driving mode. The horizontal (x-axis) denotes time and the vertical markers t0-t3 identify relevant times in the timing diagram 800 for operating the dual motor electric driveline.

Timing diagram 800 of FIG. 8 shows plots 802, 804, 806, and 808, which illustrate states of components and/or control settings of the driveline over time. Plot 802 illustrates a road condition which may be uphill or flat. Plot 804 illustrates a vehicle driving speed. Plot 806 illustrates a motor output torque. Plot 808 illustrates a driving mode, which may be 4WD or 2WD.

At t0, the vehicle is travelling uphill. The driving mode selected by the controller is 4WD such that the first clutch, the second clutch is open, and the third clutch is closed. The vehicle speed is moderate (e.g., 30 miles per hour [mph]). The output torque is high (e.g., 600 lb-ft). From t0 to t1, the vehicle drives up the hill in 4WD at a moderate speed and high torque.

At t1, the controller detects the hill leveling. The vehicle speed remains moderate, output torque high. The controller determines a transition from 4WD to 2WD is desired. From t1 to t2, the controller transitions to 2WD. To execute the transition to 2WD, the first and second motor torques are synchronized before the first clutch is opened while the second clutch is closed. The speed of the vehicle increases and the output torque is reduced.

At t2, the controller completes the transition to 2WD driving mode such that the first clutch is open, the second clutch is closed, and the third clutch is closed. The vehicle speed is high (e.g., 60 mph). The output torque is lower (e.g., 200 lb-ft). From t2 to t3, the vehicle travels in 2WD at a high speed and lower torque output on flat surface.

In this way, a dual motor electric drive system achieves operation that is more flexible, with increased drivability, and more efficient motor sizing. In some examples, the drive system may provide for a two-speed transmission with reduced torque interruptions during gear shifting operations. The drive system may enable driving modes for power efficiency, increased traction, and increased speed. In some examples, the drive system may enable selective control of torque distribution between axles or wheels. In some examples, the drive system may selectively function similar to a mechanical differential with axle-locking capability for increased traction. In some examples, the drive system may selectively enable independent wheel control. In some examples, the drive system may enable independent axle control. In some examples, the drive system may be enclosed in a common housing with shared electronic and cooling components for ease of installation and compact design. The technical effect of the drive system, as described herein, is increased performance and drivability.

In another representation, a method for a vehicle having a first electric motor directly coupled to a first output shaft, a second electric motor coaxially aligned with the first electric motor, at least one reduction gear set, a first clutch, and a second clutch, the method comprising: selecting a driving mode and transitioning the vehicle to the driving mode, including selectively driving the first output shaft with the first electric motor, selectively coupling the first output shaft with the second electric motor via the first clutch, and selectively coupling the first output shaft with the second electric motor through the at least one reduction gear set via the second clutch.

In another representation, a method for a vehicle having a first electric motor driving a first output shaft, a second electric motor driving a second output shaft, the second electric motor coaxially aligned with the first electric motor, and a clutch, the method comprising: selecting a driving mode and transitioning the vehicle to the driving mode, including selectively coupling the first electric motor and the second electric motor via the clutch.

In another representation, a method for a vehicle having a first electric motor selectively coupled to a first output shaft, a second electric motor coaxially aligned with the first electric motor, the second electric motor coupled to a second output shaft, a first clutch, and a second clutch, the method comprising: selecting a driving mode and transitioning the vehicle to the driving mode, including selectively coupling the first output shaft with the first electric motor via the first clutch and selectively coupling the first electric motor with the second output shaft via the second clutch.

In another representation, a method for a vehicle having a first electric motor selectively coupled to a first output shaft, a second electric motor coaxially aligned with the first electric motor, the second electric motor coupled to a second output shaft, a first clutch, a second clutch, and a third clutch, the method comprising: selecting a driving mode and transitioning the vehicle to the driving mode, including selectively coupling the first output shaft with the first electric motor via the first clutch, selectively coupling the first electric motor with the second output shaft via the second clutch, and selectively coupling the second electric motor with the second output shaft via the third clutch.

The disclosure also provides support for an assembly comprising: a first electric motor directly coupled to a first output shaft, a second electric motor coaxially aligned with the first electric motor, a planetary gear set connected to the first output shaft and the first electric motor, and to a second shaft, a first clutch for selectively coupling the second electric motor to the first electric motor, and a second clutch for selectively coupling the second electric motor to the second shaft. In a first example of the system, the first electric motor and the second electric motor are installed in a common housing. In a second example of the system, optionally including the first example, the first electric motor is arranged on a first side of the common housing, the second electric motor is arranged on a second side of the common housing interposed between the first clutch and the second clutch, and the planetary gear set is interposed between the first electric motor and the first clutch. In a third example of the system, optionally including one or both of the first and second examples, the second electric motor comprises a rotor having a hollow shaft, and the first output shaft and the second shaft are coaxially aligned. In a fourth example of the system, optionally including one or more or each of the first through third examples, the planetary gear set has a carrier connected to the first output shaft and the first electric motor, a ring gear connected to ground, and a sun gear connected to the second shaft, and wherein the first clutch selectively couples the second electric motor to the first electric motor via the carrier and the second clutch selectively couples the second electric motor to the second shaft. In a fifth example of the system, optionally including one or more or each of the first through fourth examples, the system further comprises: a controller having instructions for controlling a torque output of the first electric motor and the torque output of the second electric motor, and operating the first clutch to selectively couple the second electric motor to the first electric motor and the second clutch to selectively couple the second electric motor to the second shaft. In a sixth example of the system, optionally including one or more or each of the first through fifth examples, the system further comprises: an axle coupled to the first output shaft, wherein the first clutch and the second clutch selectively couple the first electric motor and the second electric motor to the axle via the first output shaft.

The disclosure also provides support for an assembly comprising: a common housing, a first electric motor driving a first output shaft, a second electric motor driving a second output shaft, the second electric motor coaxially aligned with the first electric motor, and a clutch for selectively coupling the first electric motor and the second electric motor wherein the first electric motor and the second electric motor are enclosed in the common housing. In a first example of the system, the system further comprises: a first reduction gear set and a second reduction gear set, the first reduction gear set coupled to the first output shaft and the second reduction gear set coupled to the second output shaft. In a second example of the system, optionally including the first example, the first reduction gear set is arranged on a first side of the housing, the second reduction gear set is arranged on a second side of the housing, the first electric motor is interposed between the first reduction gear set and the clutch, and the second electric motor is interposed between the clutch and the second reduction gear set. In a third example of the system, optionally including one or both of the first and second examples, the system further comprises: a controller having instructions for controlling a torque output of the first electric motor and the torque output of the second electric motor, and operating the clutch to selectively couple the first output shaft and the second output shaft. In a fourth example of the system, optionally including one or more or each of the first through third examples, the system further comprises: a first wheel and a second wheel, the first wheel coupled to the first output shaft and the second wheel coupled to the second output shaft.

The disclosure also provides support for an assembly comprising, a common housing, a first electric motor selectively coupled to a first output shaft, a second electric motor coaxially aligned with the first electric motor, the second electric motor coupled to a second output shaft, a first clutch for selectively coupling the first electric motor with the first output shaft, and a second clutch for selectively coupling the first electric motor to the second output shaft wherein the first electric motor and the second electric motor are enclosed in the common housing. In a first example of the system, the system further comprises: a first reduction gear set and a second reduction gear set, the first reduction gear set coupled to the first output shaft and the second reduction gear set coupled to the second output shaft. In a second example of the system, optionally including the first example, the first reduction gear set is configured to provide a first gear ratio and the second reduction gear set is configured to provide a second gear ratio, the first gear ratio being higher than the second gear ratio. In a third example of the system, optionally including one or both of the first and second examples, the first clutch is arranged on a first side of the common housing, the second electric motor is arranged on a second side of the common housing, the first electric motor is positioned between the first clutch and the second clutch, and the second clutch is positioned between the first electric motor and second electric motor. In a fourth example of the system, optionally including one or more or each of the first through third examples, the system further comprises: a first axle and a second axle, the first axle coupled to the first output shaft and the second axle coupled to the second output shaft. In a fifth example of the system, optionally including one or more or each of the first through fourth examples, the system further comprises: a controller having instructions for controlling a torque output of the first electric motor and the torque output of the second electric motor, and operating the first clutch to selectively couple the first electric motor with the first output shaft and the second clutch to selectively couple the first electric motor to the second output shaft. In a sixth example of the system, optionally including one or more or each of the first through fifth examples, the system further comprises: a third clutch for selectively coupling the second electric motor to the second output shaft. In a seventh example of the system, optionally including one or more or each of the first through sixth examples, the controller has instructions for operating the third clutch to selectively couple the second electric motor with the second output shaft.

Note that the example control and estimation routines included herein can be used with various vehicle system configurations. The control methods and routines disclosed herein may be stored as executable instructions in non-transitory memory and may be carried out by the control system including the controller in combination with the various sensors, actuators, and other system hardware. The specific routines described herein may represent one or more of any number of processing strategies. As such, various commands, operations, and/or actions described herein may be performed in the sequence illustrated, in tandem, or in some cases omitted. Likewise, the order of processing is provided for ease of description and is not necessarily required to achieve the features and advantages of the examples described herein. One or more of the actions, operations, and/or functions, described herein may be repeatedly performed depending on the particular strategy being used. Further, the described actions, operations, and/or functions may graphically represent code to be programmed into non-transitory memory of the computer readable storage medium in a differential control system, where the described actions are carried out by executing the instructions in a system including the various hardware components in combination with the electronic controller.

It will be appreciated that the configurations and routines disclosed herein are exemplary in nature, and that these specific examples are not to be considered in a limiting sense, because numerous variations are possible. For example, the above technology may be applied to motor systems with different configurations and in a vehicle with a variety of propulsion sources such as motors, engines, combinations thereof, etc. Moreover, the terms "first," "second," "third," and the like are not intended to denote any order, position, quantity, or importance, but rather are used merely as labels to distinguish one element from another, unless explicitly stated to the contrary. The subject matter of the present disclosure includes all novel and non-obvious combinations and sub-combinations of the various systems and configurations, and other functions, features, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither excluding nor requiring two or more such elements. Other combinations and sub-combinations of the disclosed features, functions, elements, and/or properties may be claimed through amendment of the present claims or through presentation of new claims in this or a related application. Such claims, whether narrower, broader, equal, or different in scope to the original claims, also are regarded as included within the subject matter of the present disclosure.

The invention claimed is:

1. An assembly comprising:
a first electric motor directly coupled to a first output shaft;
a second electric motor coaxially aligned with the first electric motor;
a planetary gear set connected to the first output shaft and the first electric motor, and to a second shaft;
a first clutch for selectively coupling the second electric motor to the first electric motor;
a second clutch for selectively coupling the second electric motor to the second shaft; and
an axle coupled to the first output shaft, wherein the first clutch and the second clutch selectively couple the first electric motor and the second electric motor to the axle via the first output shaft.

2. The assembly of claim 1, wherein the first electric motor and the second electric motor are installed in a common housing.

3. The assembly of claim 2, wherein the first electric motor is arranged on a first side of the common housing, the second electric motor is arranged on a second side of the common housing interposed between the first clutch and the second clutch, and the planetary gear set is interposed between the first electric motor and the first clutch.

4. The assembly of claim 1, wherein the second electric motor comprises a rotor having a hollow shaft, and the first output shaft and the second shaft are coaxially aligned.

5. The assembly of claim 1, further comprising a controller having instructions for controlling a torque output of the first electric motor and the torque output of the second electric motor, and operating the first clutch to selectively couple the second electric motor to the first electric motor and the second clutch to selectively couple the second electric motor to the second shaft.

6. An assembly comprising:
a first electric motor directly coupled to a first output shaft;
a second electric motor coaxially aligned with the first electric motor;
a planetary gear set connected to the first output shaft and the first electric motor, and to a second shaft;
a first clutch for selectively coupling the second electric motor to the first electric motor;
a second clutch for selectively coupling the second electric motor to the second shaft,
wherein the planetary gear set has a carrier connected to the first output shaft and the first electric motor, a ring gear connected to ground, and a sun gear connected to the second shaft, and wherein the first clutch selectively couples the second electric motor to the first electric motor via the carrier and the second clutch selectively couples the second electric motor to the second shaft.

* * * * *